(12) United States Patent
Torchin et al.

(10) Patent No.: US 12,045,449 B2
(45) Date of Patent: Jul. 23, 2024

(54) ACTIVITY STREAM FOUNDATIONS

(71) Applicant: Apple Inc., Cupertino, CA (US)

(72) Inventors: Evan S. Torchin, Austin, TX (US); Allen W. Lucas, Redwood City, CA (US); Jesse W. Bunch, Palo Alto, CA (US); Joseph J. Stelmach, Cupertino, CA (US); Markus Hagele, San Francisco, CA (US); Steffen Ryll, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/805,632

(22) Filed: Jun. 6, 2022

(65) Prior Publication Data
US 2022/0391076 A1 Dec. 8, 2022

Related U.S. Application Data

(60) Provisional application No. 63/197,328, filed on Jun. 4, 2021.

(51) Int. Cl.
*G06F 3/0484* (2022.01)
*G06F 3/04845* (2022.01)

(52) U.S. Cl.
CPC ................ *G06F 3/04845* (2013.01)

(58) Field of Classification Search
CPC .................................................. G06F 3/04845
See application file for complete search history.

(56) References Cited

U.S. PATENT DOCUMENTS

| | | | | |
|---|---|---|---|---|
| 10,691,880 B2* | 6/2020 | Hastings | | G06F 40/151 |
| 10,963,143 B2* | 3/2021 | Gan | | G06F 40/166 |
| 11,036,375 B1* | 6/2021 | Delaney | | G06F 3/04845 |
| 11,221,745 B2* | 1/2022 | Wang | | G06F 21/32 |
| 2008/0168403 A1* | 7/2008 | Westerman | | G06F 3/0488 715/863 |
| 2012/0166988 A1* | 6/2012 | Tsai | | G06F 3/04845 715/766 |
| 2013/0110974 A1* | 5/2013 | Arrasvuori | | G06F 3/04883 709/217 |
| 2013/0345962 A1* | 12/2013 | van Os | | G01C 21/3667 701/416 |
| 2014/0071119 A1* | 3/2014 | Piemonte | | G06T 19/003 345/419 |
| 2014/0085045 A1* | 3/2014 | Arrasvuori | | G06F 3/033 340/5.1 |
| 2015/0082181 A1* | 3/2015 | Ames | | G06F 3/04815 715/738 |

(Continued)

Primary Examiner — Linh K Pham
(74) Attorney, Agent, or Firm — Blank Rome LLP

(57) ABSTRACT

The present disclosure generally relates to user interfaces for managing user contributions and activity for shared files and folder. With respect to a document, at least a portion of the document is presented. User input in the form of a request to shift the document in a first direction is received. In response to the request passing a predetermined boundary, indications of content contribution attributable to different users is displayed. With respect to one or more digital files, a user input component is presented and is associated with the one or more digital files. User input is received via the user input component. In response to the received user input, an update activity panel is presented which shows multiple activity attributable to different users.

13 Claims, 28 Drawing Sheets

(56) References Cited

U.S. PATENT DOCUMENTS

| | | | |
|---|---|---|---|
| 2015/0220253 A1* | 8/2015 | Landau | G06F 3/0483 |
| | | | 715/204 |
| 2016/0224223 A1* | 8/2016 | Ren | G06F 3/0488 |
| 2016/0253055 A1* | 9/2016 | Zhang | G06F 3/04845 |
| | | | 715/800 |
| 2016/0259530 A1* | 9/2016 | Everitt | G06F 3/0485 |
| 2017/0147189 A1* | 5/2017 | Ryu | G06F 3/04886 |
| 2017/0269821 A1* | 9/2017 | Kano | G06F 3/04845 |
| 2018/0039469 A1* | 2/2018 | Han | G06F 3/0486 |
| 2018/0145937 A1* | 5/2018 | Choi | H04L 51/10 |
| 2018/0232130 A1* | 8/2018 | Zhu | G06F 3/04847 |
| 2019/0018570 A1* | 1/2019 | Zeng | G06F 3/04845 |
| 2019/0387094 A1* | 12/2019 | Lee | H04M 1/725 |
| 2021/0058359 A1* | 2/2021 | Lee | H04L 51/046 |
| 2023/0229300 A1* | 7/2023 | Lu | G06F 3/0485 |
| | | | 715/769 |

\* cited by examiner

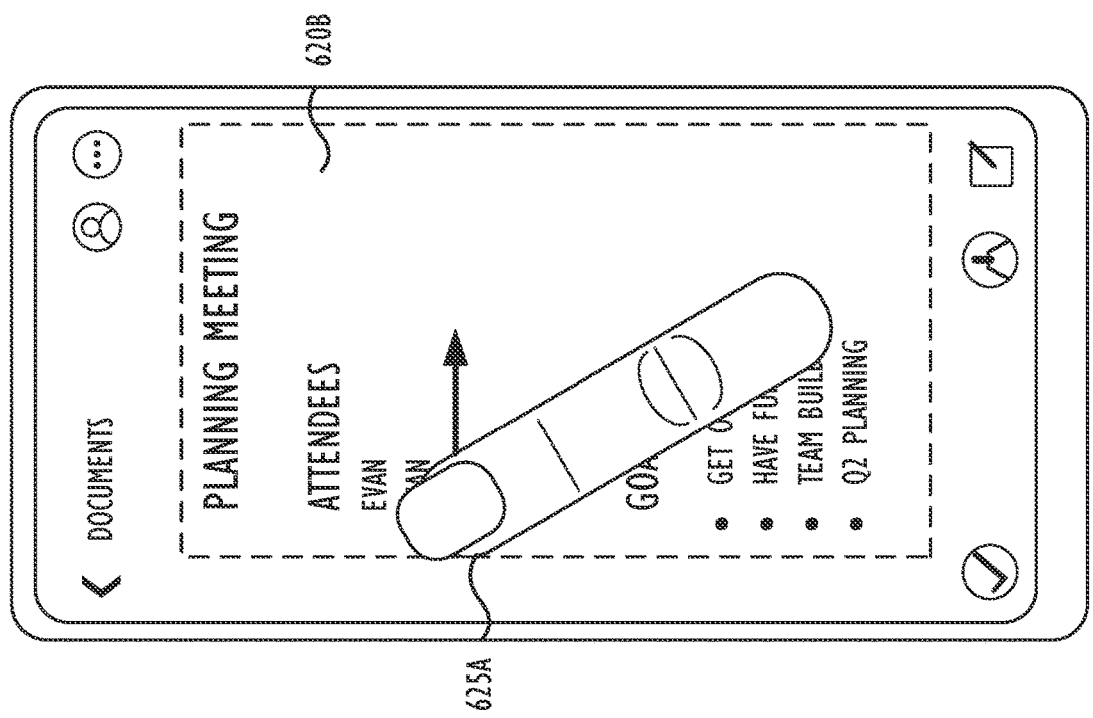
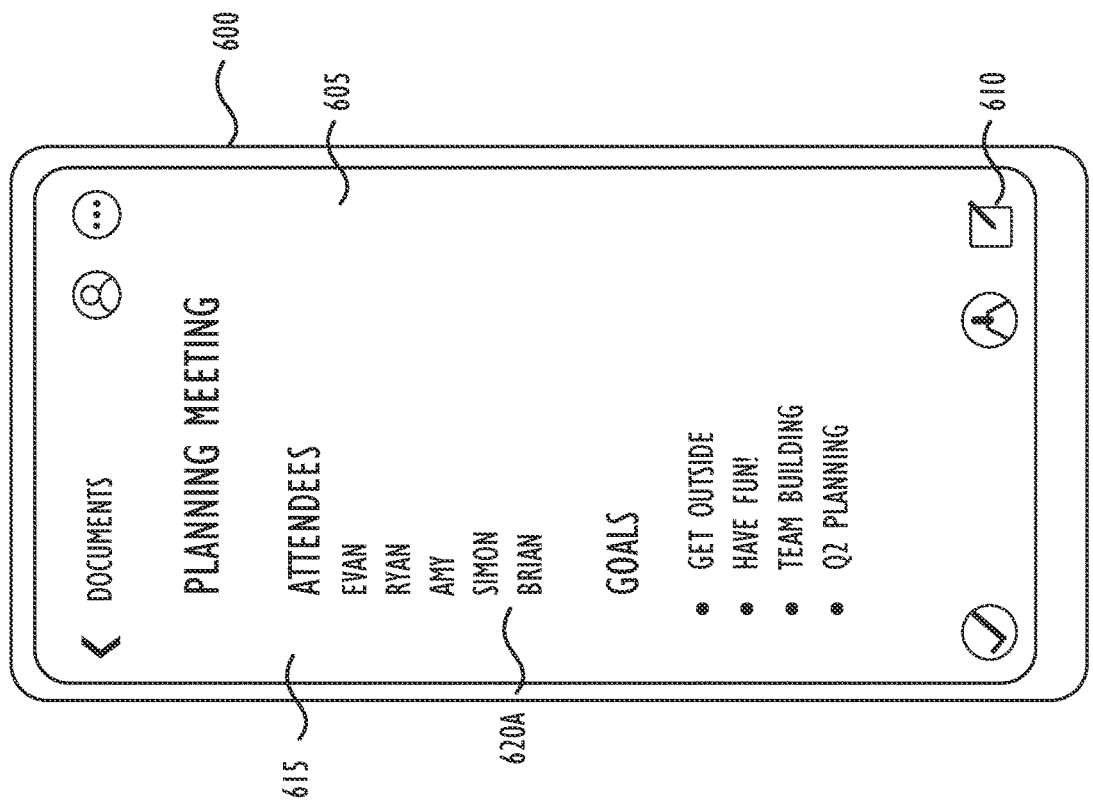
FIG. 6B
FIG. 6A

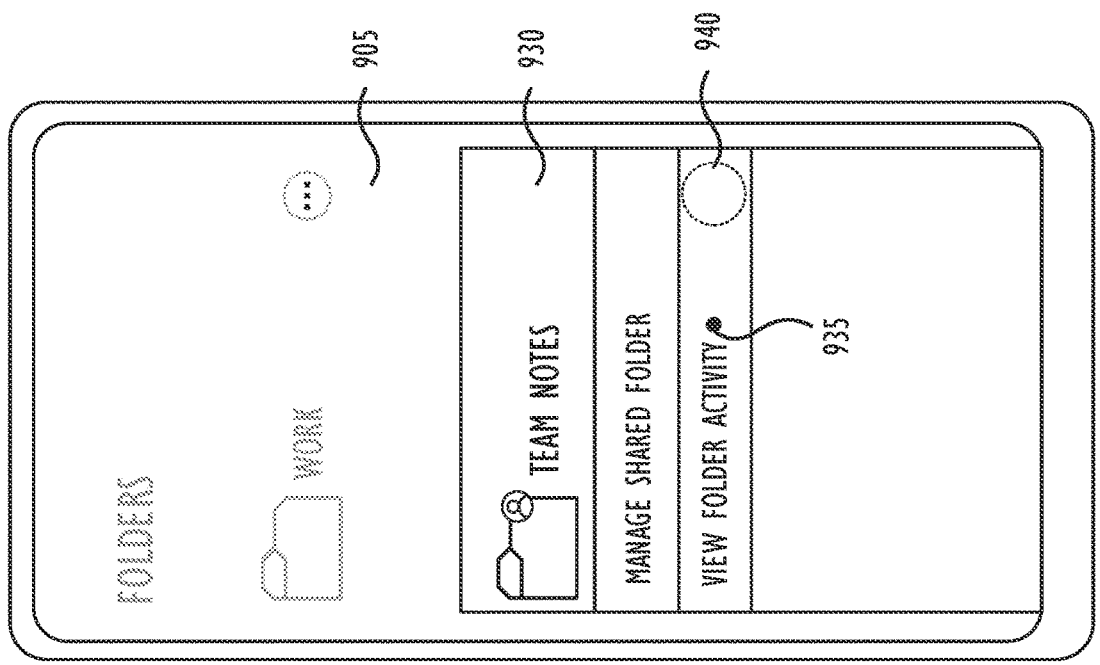
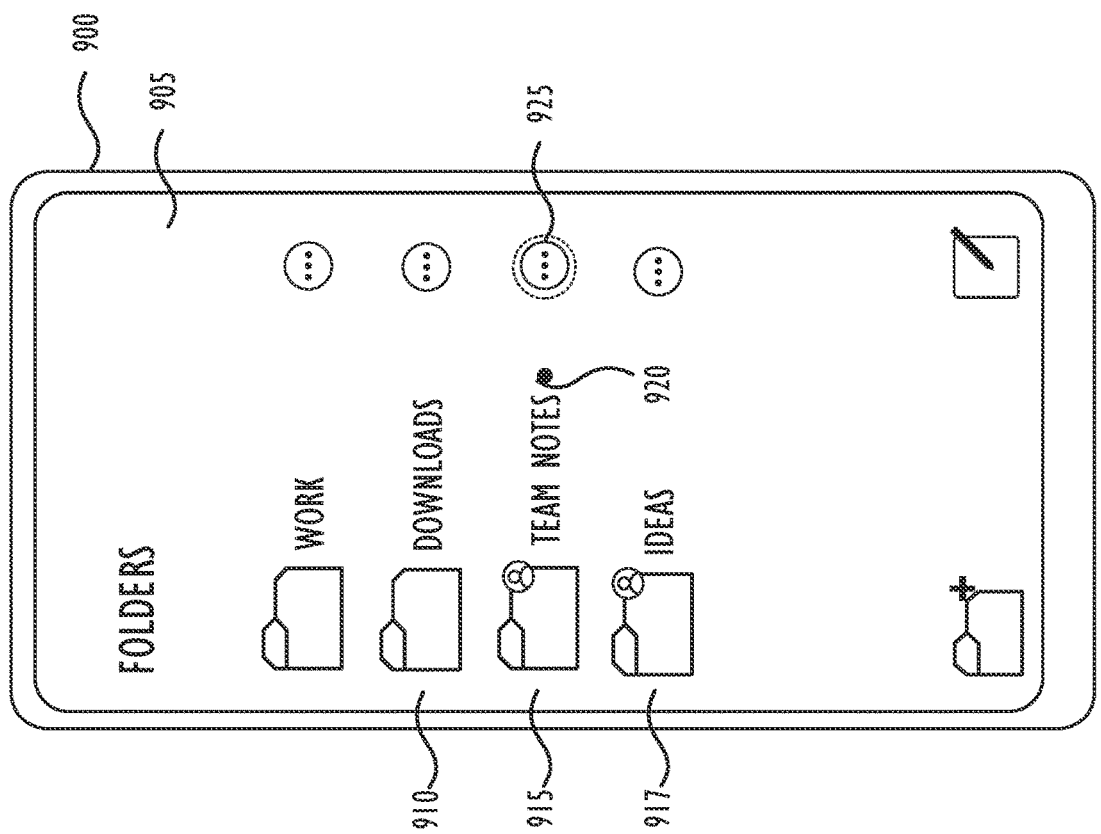
FIG. 9B
FIG. 9A

ACTIVITY STREAM FOUNDATIONS

FIELD

The present disclosure relates generally to computer user interfaces, and more specifically to techniques for managing indications of contributions by multiple users in a shared document or folder.

BACKGROUND

Present technology allows multiple users to contribute edits or content to a particular file or document. Typically, a document may be shared among multiple users. Those users can provide content contributions to the document. For example, users can add content, remove content, edit content, and the like. In additions, multiple users can contribute concurrently, such as by accessing the document at the same time. Sometimes, a user may leave the document and return later to review content that has been added since the user last viewed the document or to provide additional contributions to the document. However, difficulties arise in tracking content contributions among various users.

Similarly, present technology allows multiple users to have shared access to a digital file folder containing multiple files. Each user may have authority to access some or all of the various files in a particular folder. In addition, user access may vary based on permissions for the various files within the folder. In some instances, multiple users may have access to perform various activities on the files, such as providing content contributions, editing, removing, or the like. However, difficulties arise in tracking activity for a shared folder attributable to various users.

BRIEF SUMMARY

Some techniques for managing user activity and content contributions in shared documents, files, and folders using electronic devices, are generally cumbersome and inefficient. For example, some existing techniques use a complex and time-consuming user interface, which may include multiple key presses or keystrokes for a user to obtain information about activities or contributions. Additionally, some existing techniques may show too many contributions or activity indications, causing a user to scroll through multiple pages on a display to view important information. Existing techniques require more time than necessary, wasting user time and device energy. This latter consideration is particularly important in battery-operated devices.

Accordingly, the present technique provides electronic devices with faster, more efficient methods and interfaces for managing contribution and activity indications. Such methods and interfaces optionally complement or replace other methods for managing event notifications. In some implementations, electronic devices providing these methods and interfaces can surface relevant activity and/or contribution information without user input or with minimal user input. Such methods and interfaces reduce the cognitive burden on a user and produce a more efficient human-machine interface. For battery-operated computing devices, such methods and interfaces conserve power and increase the time between battery charges.

A first method comprises presenting at least a portion of a document in a user interface, wherein content of the document comprises content contributions from a plurality of users, receiving a first user input, the user input including a request to shift the document in a first direction, and after receiving the request: in accordance with a determination the request to shift the document in the first direction is to shift the document passed a predetermined boundary, presenting a plurality of indications of content contributions, each indication associating a content contribution and a user.

A non-transitory computer-readable storage medium storing one or more programs configured to be executed by one or more processors of an electronic device with a display and a touch-sensitive surface, the one or more programs including instructions for performing the first method.

An electronic device, comprising a display, a touch-sensitive surface, one or more processors, and memory storing one or more programs configured to be executed by the one or more processors, the one or more programs including instructions for performing the first method.

An electronic device, comprising a display, a touch-sensitive surface, and means for performing the first method.

A non-transitory computer-readable storage medium storing one or more programs configured to be executed by one or more processors of an electronic device with a display and a touch-sensitive surface, the one or more programs including instructions for presenting at least a portion of a document in a user interface, wherein content of the document comprises content contributions from a plurality of users, receiving a first user input, the user input including a request to shift the document in a first direction, and after receiving the request: in accordance with a determination the request to shift the document in the first direction is to shift the document passed a predetermined boundary, presenting a plurality of indications of content contributions, each indication associating a content contribution and a user.

An electronic device, comprising, a display, a touch-sensitive surface, one or more processors, and memory storing one or more programs configured to be executed by the one or more processors, the one or more programs including instructions for presenting at least a portion of a document in a user interface, wherein content of the document comprises content contributions from a plurality of users, receiving a first user input, the user input including a request to shift the document in a first direction, and after receiving the request: in accordance with a determination the request to shift the document in the first direction is to shift the document passed a predetermined boundary, presenting a plurality of indications of content contributions, each indication associating a content contribution and a user. An electronic device, comprising a display, a touch-sensitive surface, means for presenting at least a portion of a document in a user interface, wherein content of the document comprises content contributions from a plurality of users, means for receiving a first user input, the user input including a request to shift the document in a first direction, and means for, after receiving the request: in accordance with a determination the request to shift the document in the first direction is to shift the document passed a predetermined boundary, presenting a plurality of indications of content contributions, each indication associating a content contribution and a user.

A transitory computer-readable storage medium storing one or more programs configured to be executed by one or more processors of an electronic device with a display and a touch-sensitive surface, the one or more programs including instructions for: presenting at least a portion of a document in a user interface, wherein content of the document comprises content contributions from a plurality of users; receiving a first user input, the user input including a request to shift the document in a first direction; and after receiving the request: in accordance with a determination the request to shift the document in the first direction is to shift the document passed a predetermined boundary, presenting a plurality of indications of content contributions, each indication associating a content contribution and a user.

A second method includes displaying, by a computing system, a user input component associated with one or more digital files, receiving user input via the user input component, and in response to receiving the user input, displaying an update activity panel associated with the one or more digital files, wherein the update activity panel provides a first indication of a first activity and a second activity for the one or more digital files, wherein the first activity is attributed to a first user identifier, and wherein the second activity is attributed to a second user identifier.

A non-transitory computer-readable storage medium storing one or more programs configured to be executed by one or more processors of an electronic device with a display and a touch-sensitive surface, the one or more programs including instructions for performing the second method.

An electronic device, comprising a display, a touch-sensitive surface, one or more processors, and memory storing one or more programs configured to be executed by the one or more processors, the one or more programs including instructions for performing the second method.

An electronic device, comprising a display, a touch-sensitive surface, and means for performing the second method.

A non-transitory computer-readable storage medium storing one or more programs configured to be executed by one or more processors of an electronic device with a display and a touch-sensitive surface, the one or more programs including instructions for displaying, by a computing system, a user input component associated with one or more digital files, receiving user input via the user input component, and in response to receiving the user input, displaying an update activity panel associated with the one or more digital files, wherein the update activity panel provides a first indication of a first activity and a second activity for the one or more digital files, wherein the first activity is attributed to a first user identifier, and wherein the second activity is attributed to a second user identifier.

An electronic device, comprising a display, a touch-sensitive surface, one or more processors, and memory storing one or more programs configured to be executed by the one or more processors, the one or more programs including instructions for displaying, by a computing system, a user input component associated with one or more digital files, receiving user input via the user input component, and in response to receiving the user input, displaying an update activity panel associated with the one or more digital files, wherein the update activity panel provides a first indication of a first activity and a second activity for the one or more digital files, wherein the first activity is attributed to a first user identifier, and wherein the second activity is attributed to a second user identifier.

An electronic device, comprising a display, a touch-sensitive surface, means for displaying, by a computing system, a user input component associated with one or more digital files, means for receiving user input via the user input component, and means for, in response to receiving the user input, displaying an update activity panel associated with the one or more digital files, wherein the update activity panel provides a first indication of a first activity and a second activity for the one or more digital files, wherein the first activity is attributed to a first user identifier, and wherein the second activity is attributed to a second user identifier.

A transitory computer-readable storage medium storing one or more programs configured to be executed by one or more processors of an electronic device with a display and a touch-sensitive surface, the one or more programs including instructions for displaying, by a computing system, a user input component associated with one or more digital files, receiving user input via the user input component, and in response to receiving the user input, displaying an update activity panel associated with the one or more digital files, wherein the update activity panel provides a first indication of a first activity and a second activity for the one or more digital files, wherein the first activity is attributed to a first user identifier, and wherein the second activity is attributed to a second user identifier.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing event notifications, thereby increasing the effectiveness, efficiency, and user satisfaction with such devices. Such methods and interfaces may complement or replace other methods for managing event notifications.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-I illustrate example user interfaces for displaying user content contributions in accordance with some embodiments.

FIGS. 9A-9D illustrate an example user interface for presenting an update activity panel, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing indications of multiple user contributions in a shared digital file or digital file folder. As an example, as a shared document is presented, a swiping action by a user may cause indications of user contributions to be presented, cutting down on keystrokes and providing an organized interface for showing attribution to various contributions to the document. As another example, an activity panel may be presented for a single file or a shared folder which provides an overview of actions taken to shared documents by different users in a consolidated manner. Such techniques can reduce the cognitive burden on a user who accesses event notifications, thereby enhancing productivity. Further, such techniques can reduce processor and battery power otherwise wasted on redundant user inputs.

Figure 4:
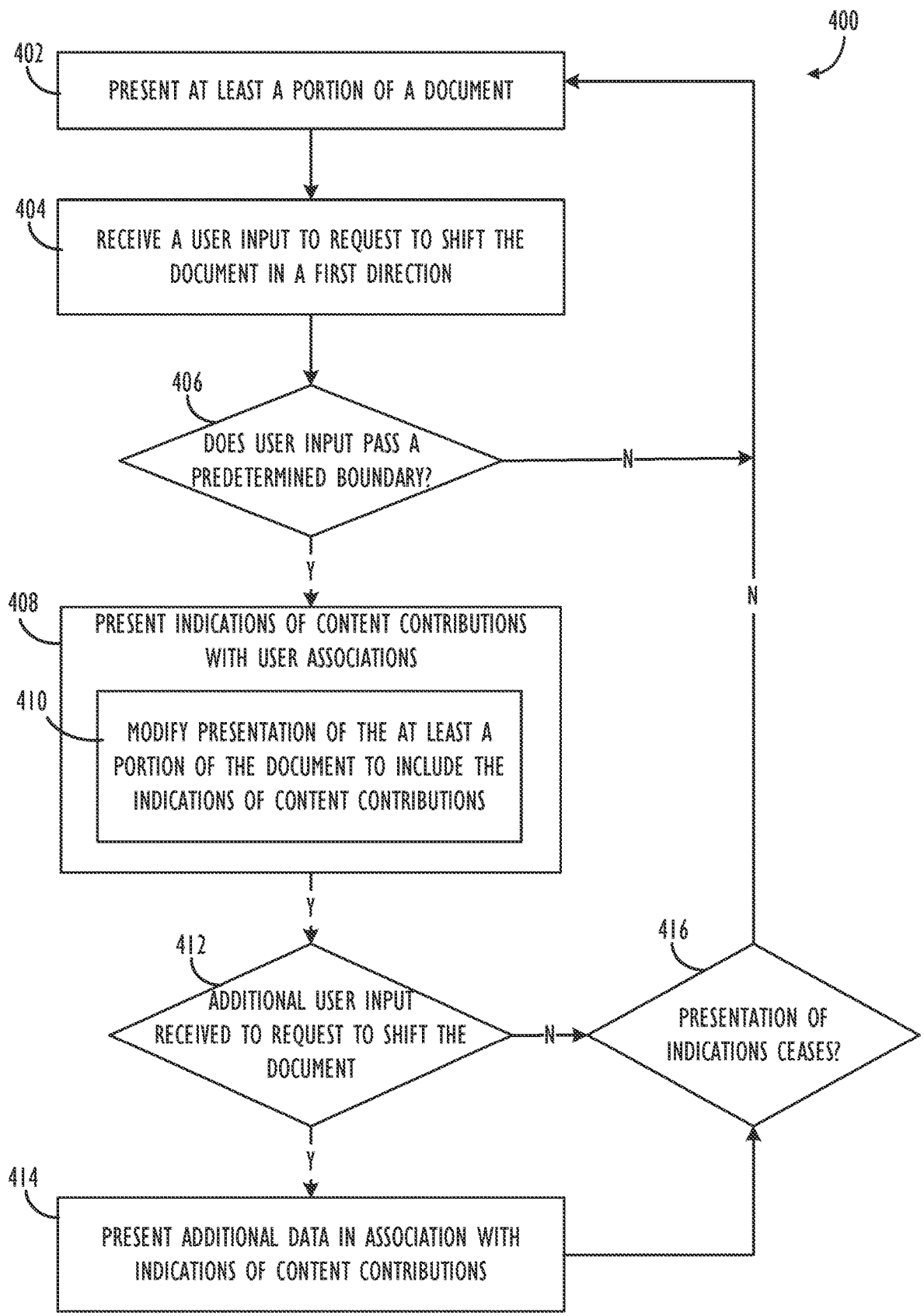
FIG. 4 illustrates a flowchart of a technique for presenting indications for user content contributions in accordance with some embodiments.
Figure 5:
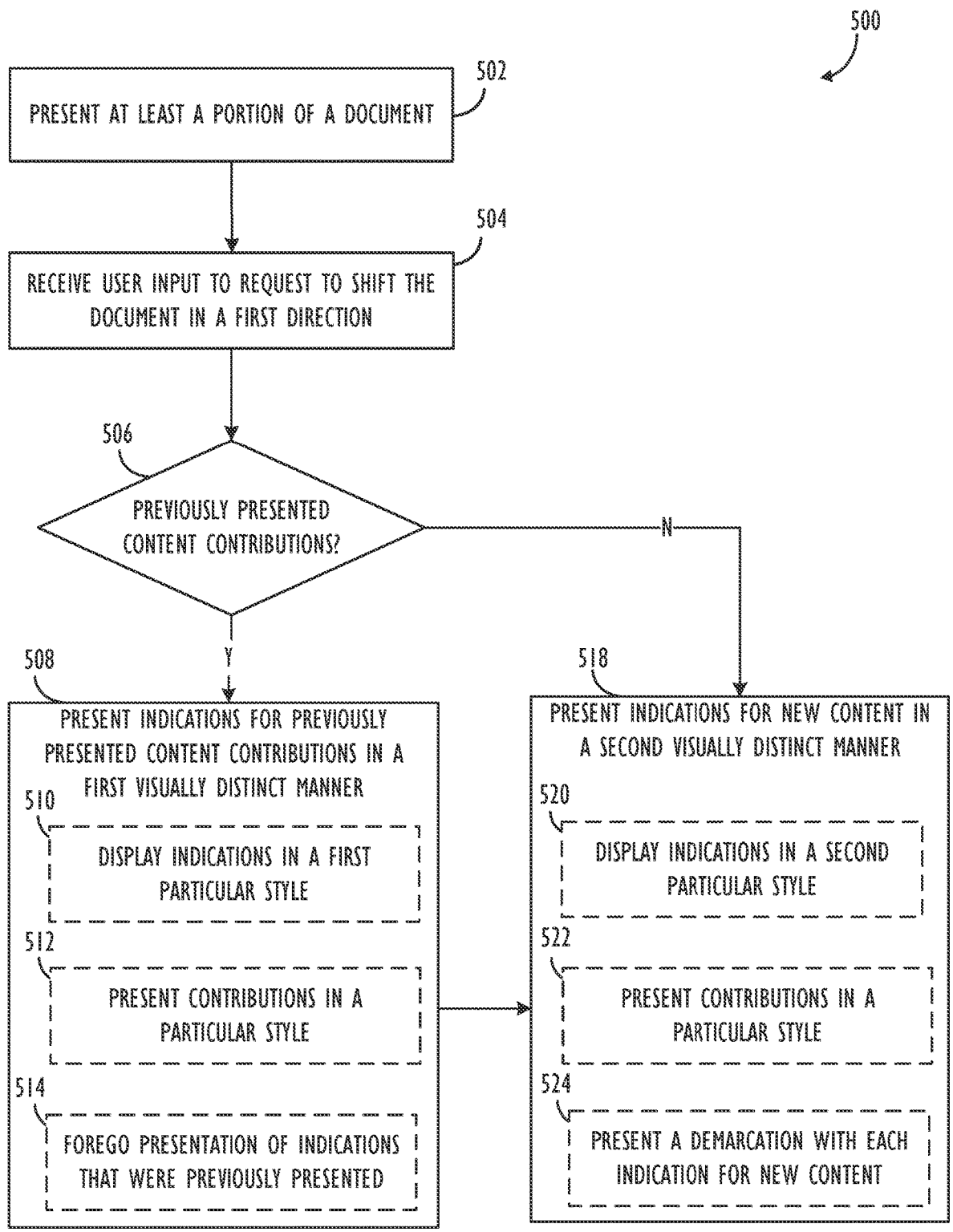
FIG. 5 illustrates a flowchart of a technique for selecting a presentation mod for indications of user content contributions in accordance with some embodiments.
Figure 6D:
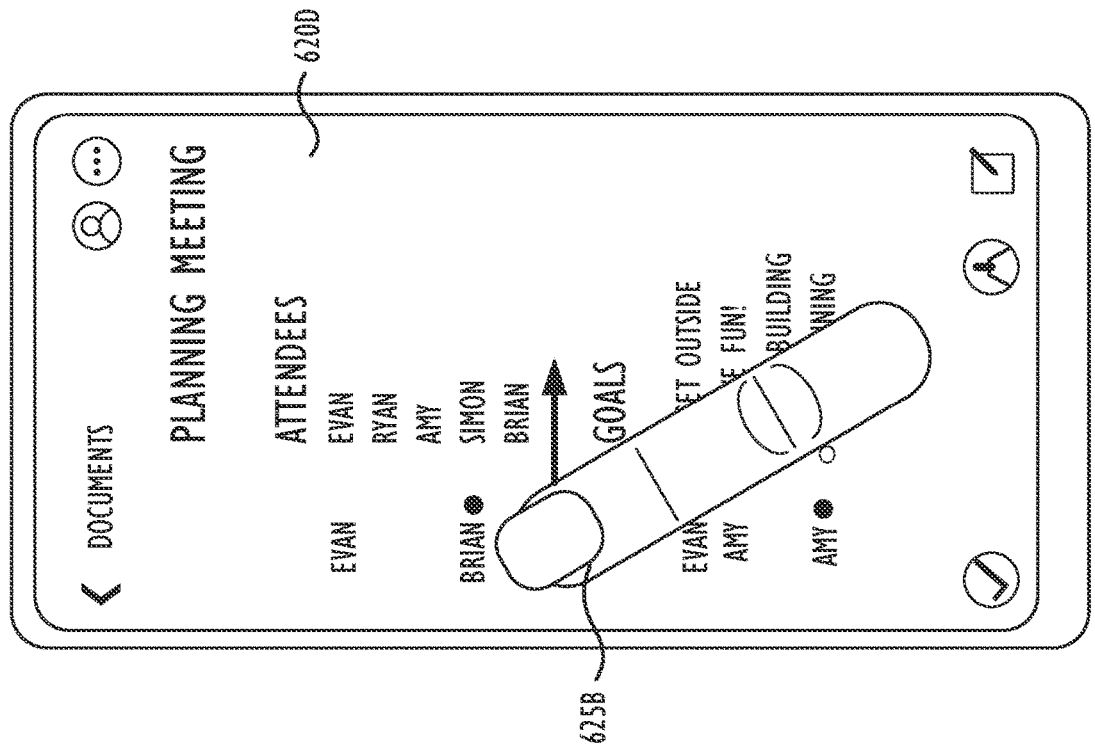
Figure 7:
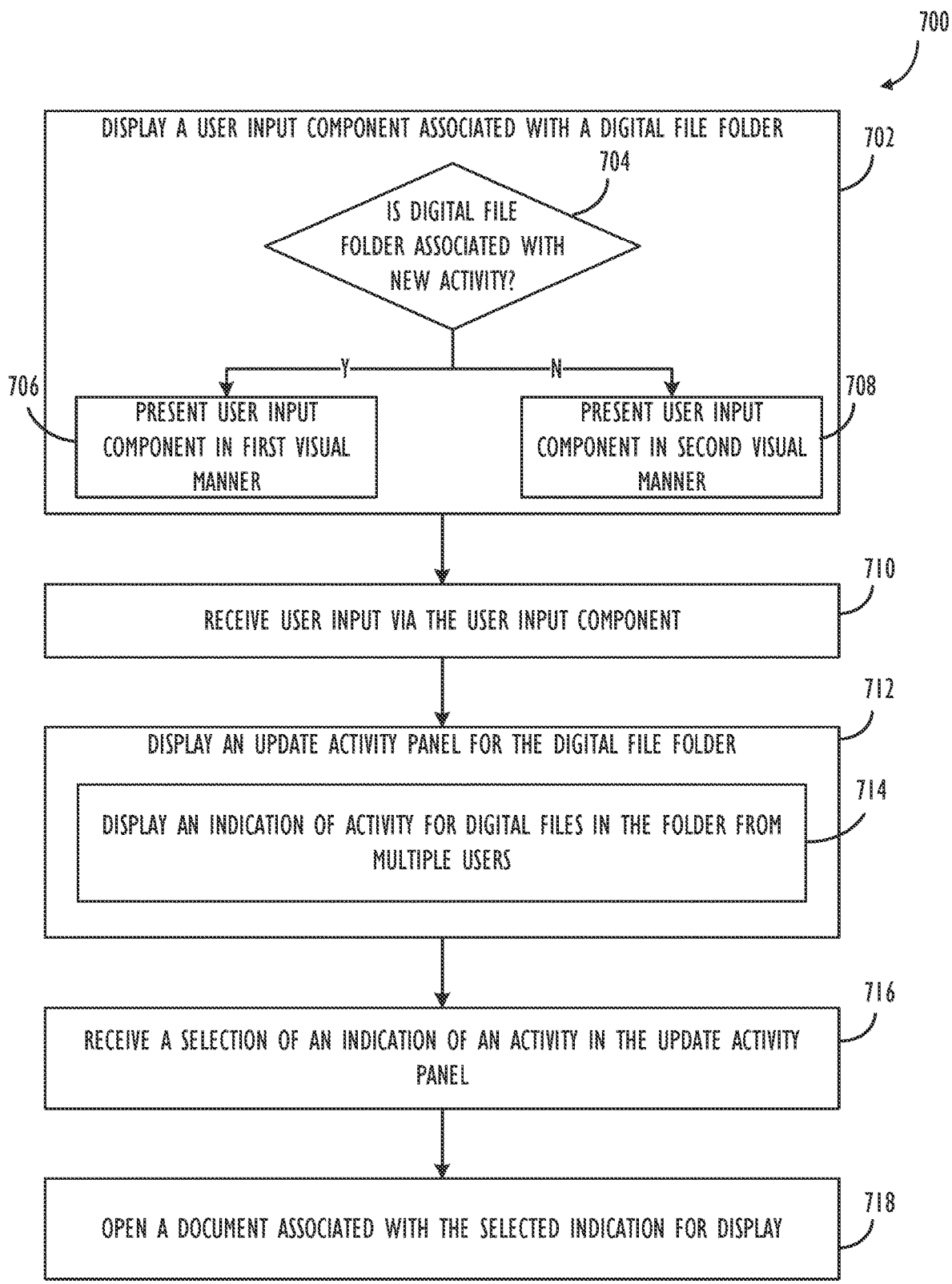
FIG. 7 illustrates a flowchart of a technique for presenting an updated activity panel in accordance with some embodiments.
Figure 8:
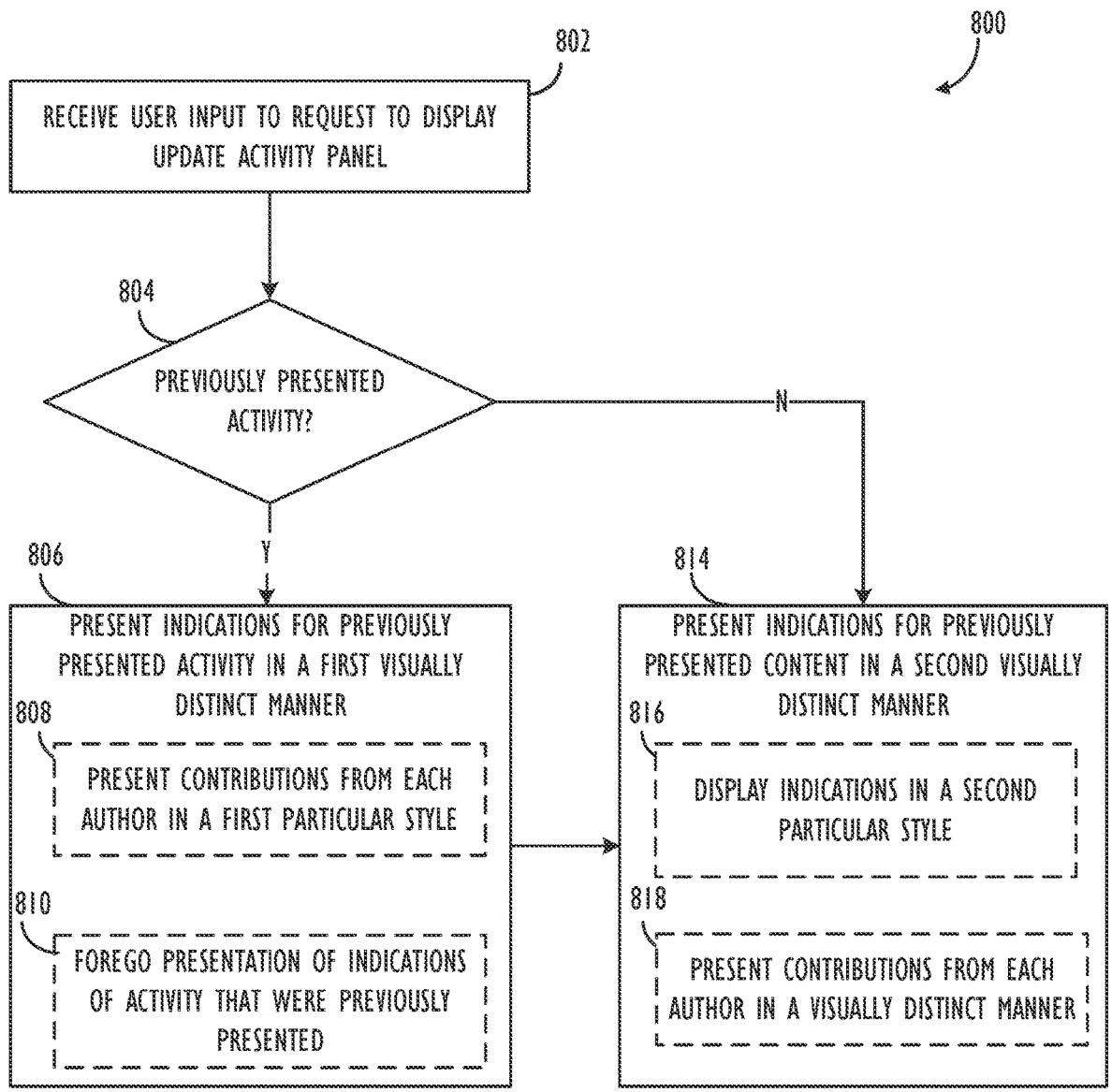
FIG. 8 illustrates a flowchart of a technique for presenting indications of user activity in accordance with some embodiments.

Below, FIGS. 1, 2, and 3A-B provide a description of exemplary devices for performing the techniques for managing event notifications. FIGS. 4-5 illustrate flowcharts of techniques for presenting indications for user content contributions in accordance with some embodiments. FIGS. 6A-6E illustrate exemplary user interfaces for displaying user content contributions. FIGS. 7-8 illustrate methods of presenting an update activity panel in accordance with some embodiments. The user interfaces in FIGS. 9A-D are used to illustrate the processes described below, including the processes in FIGS. 7-8. FIG. 10 illustrates a flowchart for a technique for displaying file-specific activity. FIGS. 11A-D and 12A-C illustrate example user interfaces for presented an update activity panel.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1:
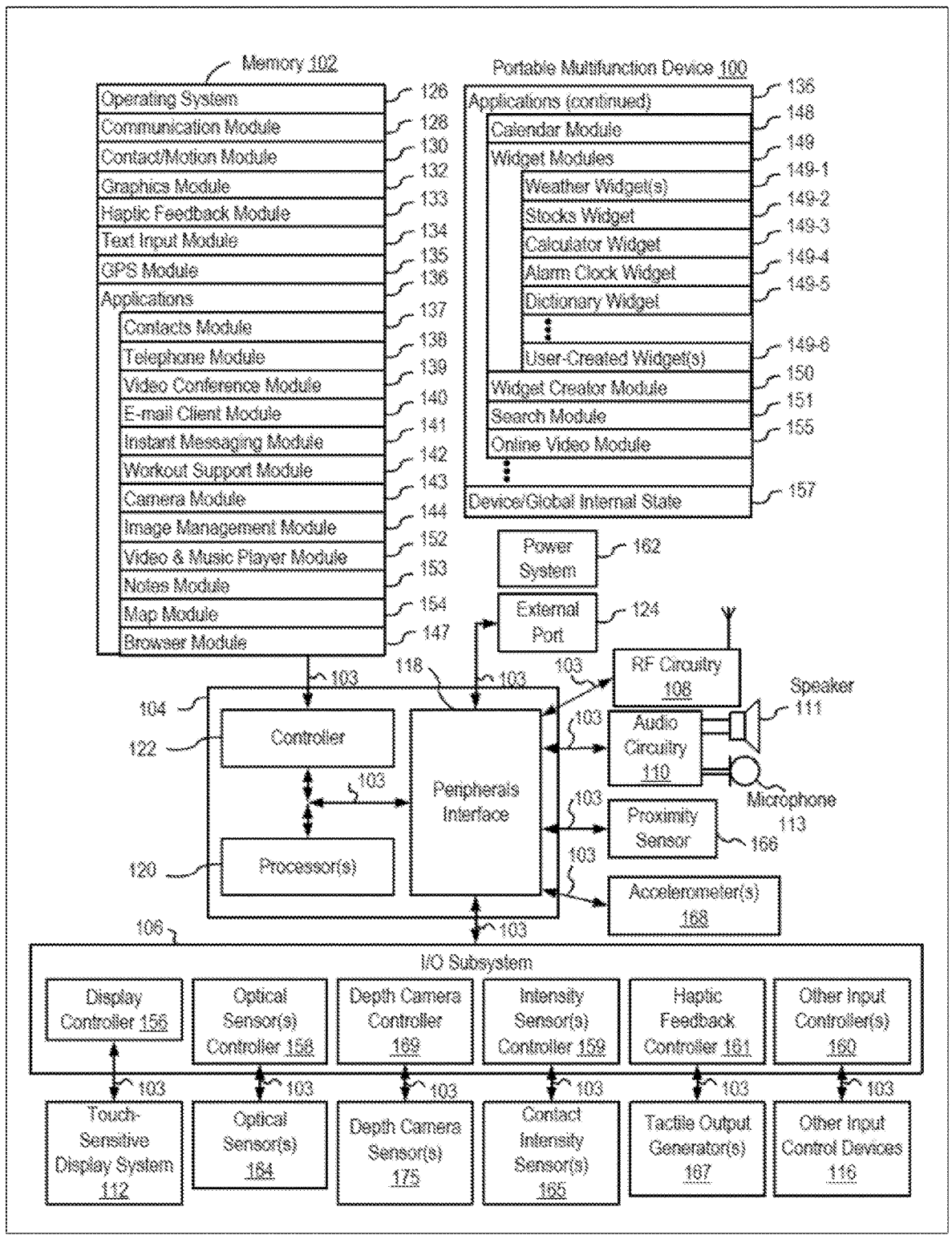
FIG. 1 is a block diagram illustrating a portable multifunction device with a touch-sensitive display in accordance with some embodiments.

Attention is now directed toward embodiments of portable devices with touch-sensitive displays. FIG. 1 is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 255 of device 200). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1 are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons optionally include an up/down button for volume control of speaker 111 and/or microphone 113. The one or more buttons optionally include a push button. In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch display 112. Touch Touch-sensitive display 112 displays visual output to the user. The visual output optionally includes graphics, text, icons, video, and any combination thereof (collectively termed "graphics"). In some embodiments, some or all of the visual output optionally corresponds to user-interface objects.

Touch display 112 has a touch-sensitive surface, sensor, or set of sensors that accepts input from the user based on haptic and/or tactile contact. Touch display 112 and display controller 156 (along with any associated modules and/or sets of instructions in memory 102) detect contact (and any movement or breaking of the contact) on touch display 112 and convert the detected contact into interaction with user-interface objects (e.g., one or more soft keys, icons, web pages, or images) that are displayed on touch display 112. In an exemplary embodiment, a point of contact between touch display 112 and the user corresponds to a finger of the user.

Touch display 112 optionally uses LCD (liquid crystal display) technology, LPD (light emitting polymer display) technology, or LED (light emitting diode) technology, although other display technologies are used in other embodiments. Touch display 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch display 112. In an exemplary embodiment, projected mutual capacitance sensing technology is used, such as that found in the iPhone® and iPod Touch® from Apple Inc. of Cupertino, California.

A touch-sensitive display in some embodiments of touch display 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch display 112 displays visual output from device 100, whereas touch-sensitive touchpads do not provide visual output.

A touch-sensitive display in some embodiments of touch display 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch display 112 optionally has a video resolution in excess of 100 dpi. In some embodiments, the touch screen has a video resolution of approximately 160 dpi. The user optionally makes contact with touch display 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch display 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1 shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1 shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch display 112 when the multifunction device is placed near the user's ear (e.g., when the user is making a phone call).

Device 100 optionally also includes one or more tactile output generators 167. FIG. 1 shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1 shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 2:
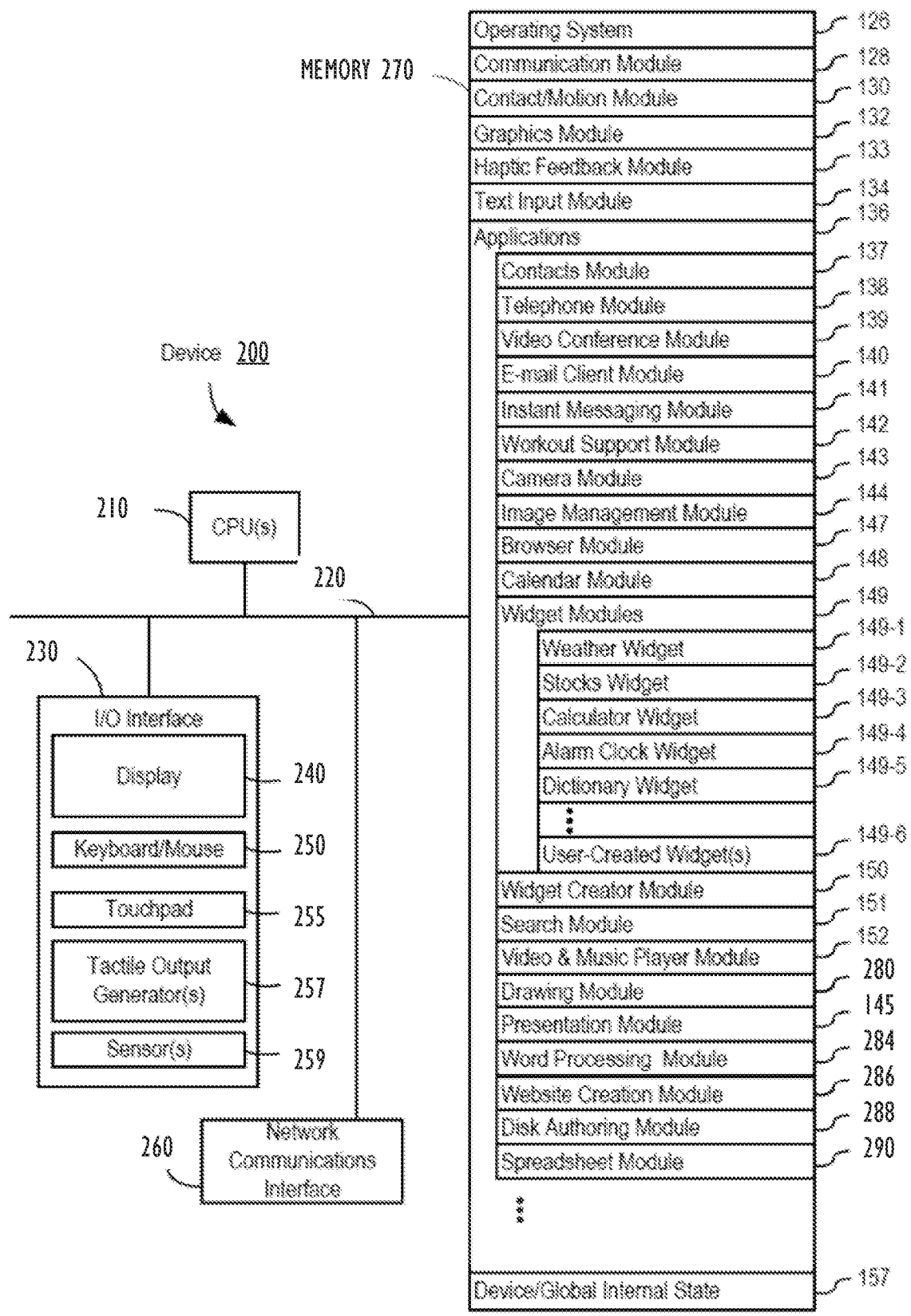
FIG. 2 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1) or 270 (FIG. 2) stores device/global internal state 157, as shown in FIGS. 1 and 2. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch display 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch display 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch display 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch display 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch display 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch display 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch display 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch display 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch display 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch display 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch display 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch display 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch display 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch display 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch display 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch display 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch display 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch display 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch display 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 2 is a block diagram of an exemplary multifunction device with a display and a touch-sensitive surface in accordance with some embodiments. Device 200 need not be portable. In some embodiments, device 200 is a laptop computer, a desktop computer, a tablet computer, a multimedia player device, a navigation device, an educational device (such as a child's learning toy), a gaming system, or a control device (e.g., a home or industrial controller). Device 200 typically includes one or more processing units (CPUs) 210, one or more network or other communications interfaces 260, memory 270, and one or more communication buses 220 for interconnecting these components. Communication buses 220 optionally include circuitry (sometimes called a chipset) that interconnects and controls communications between system components. Device 200 includes input/output (I/O) interface 230 comprising display 240, which is typically a touch screen display. I/O interface 230 also optionally includes a keyboard and/or mouse (or other pointing device) 250 and touchpad 255, tactile output generator 257 for generating tactile outputs on device 200 (e.g., similar to tactile output generator(s) 167 described above with reference to FIG. 1), sensors 259 (e.g., optical, acceleration, proximity, touch-sensitive, and/or contact intensity sensors similar to contact intensity sensor(s) 165 described above with reference to FIG. 1). Memory 270 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 270 optionally includes one or more storage devices remotely located from CPU(s) 210. In some embodiments, memory 270 stores programs, modules, and data structures analogous to the programs, modules, and data structures stored in memory 102 of portable multifunction device 100 (FIG. 1), or a subset thereof. Furthermore, memory 270 optionally stores additional programs, modules, and data structures not present in memory 102 of portable multifunction device 100. For example, memory 270 of device 200 optionally stores drawing module 280, presentation module 282, word processing module 284, website creation module 286, disk authoring module 288, and/or spreadsheet module 290, while memory 102 of portable multifunction device 100 (FIG. 1A) optionally does not store these modules.

Each of the above-identified elements in FIG. 2 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 270 optionally stores a subset of the modules and data structures identified above. Furthermore, memory 270 optionally stores additional modules and data structures not described above.

Attention is now directed towards embodiments of user interfaces that are, optionally, implemented on, for example, portable multifunction device 100.

Figure 3A:
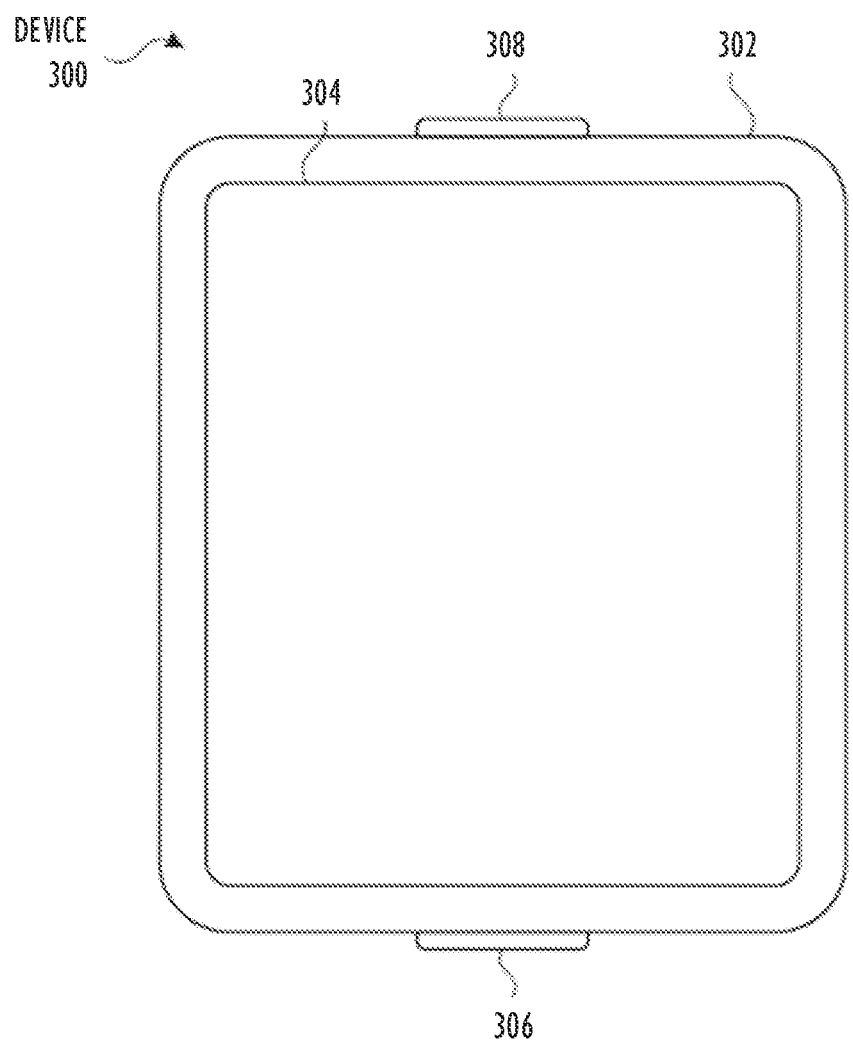
FIGS. 3A-B illustrates a personal electronic device in accordance with some embodiments.

FIG. 3A illustrates exemplary personal electronic device 300. Device 300 includes body 302. In some embodiments, device 300 can include some or all of the features described with respect to devices 100 and 200 (e.g., FIGS. 1-2).

In some embodiments, device 300 has one or more input mechanisms 306 and 308. Input mechanisms 306 and 308, if included, can be physical. Examples of physical input mechanisms include push buttons and rotatable mechanisms. In some embodiments, device 300 has one or more attachment mechanisms. Such attachment mechanisms, if included, can permit attachment of device 300 with, for example, hats, eyewear, earrings, necklaces, shirts, jackets, bracelets, watch straps, chains, trousers, belts, shoes, purses, backpacks, and so forth. These attachment mechanisms permit device 300 to be worn by a user.

Figure 3B:
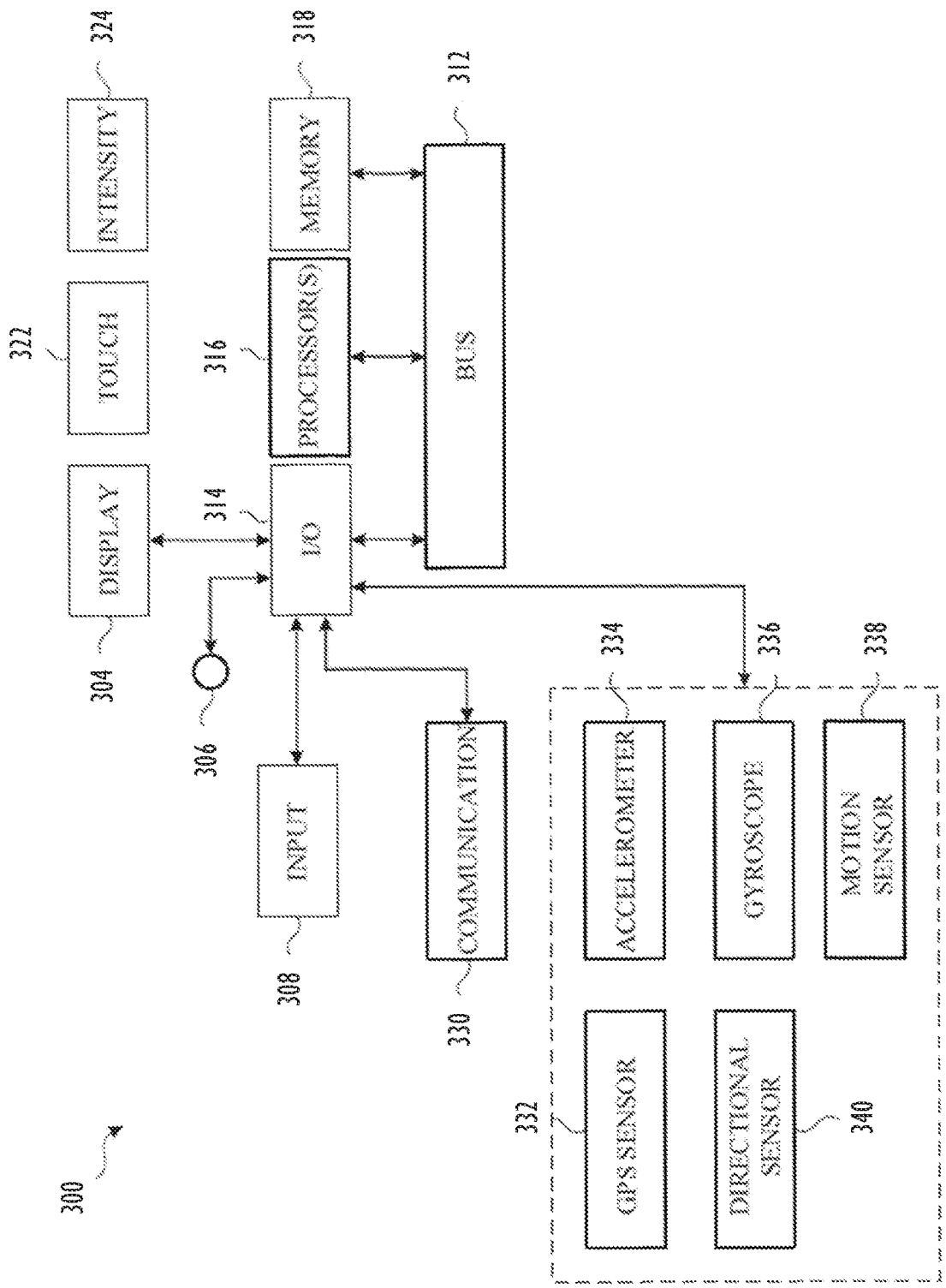

FIG. 3B depicts exemplary personal electronic device 300. In some embodiments, device 300 can include some or all of the components described with respect to FIGS. 1 and 2. Device 300 has bus 312 that operatively couples I/O section 314 with one or more computer processors 316 and memory 318. I/O section 314 can be connected to display 304, which can have touch-sensitive component 322 and, optionally, intensity sensor 324 (e.g., contact intensity sensor). In addition, I/O section 314 can be connected with communication unit 330 for receiving application and operating system data, using Wi-Fi, Bluetooth, near field communication (NFC), cellular, and/or other wireless communication techniques. Device 300 can include input mechanisms 306 and/or 308. Input mechanism 306 is, optionally, a rotatable input device or a depressible and rotatable input device, for example. Input mechanism 308 is, optionally, a button, in some examples.

Input mechanism 308 is, optionally, a microphone, in some examples. Personal electronic device 300 optionally includes various sensors, such as GPS sensor 332, accelerometer 334, directional sensor 340 (e.g., compass), gyroscope 336, motion sensor 338, and/or a combination thereof, all of which can be operatively connected to I/O section 314.

Memory 318 of personal electronic device 300 can include one or more non-transitory computer-readable storage mediums, for storing computer-executable instructions, which, when executed by one or more computer processors 316, for example, can cause the computer processors to perform the techniques described below. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 300 is not limited to the components and configuration of FIG. 3B, but can include other or additional components in multiple configurations.

As used here, the term "affordance" refers to a user-interactive graphical user interface object that is, optionally, displayed on the display screen of devices 100, 200, and/or 300 (FIGS. 1, 2, and 3A-3B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 255 in FIG. 2) while the cursor is over a particular user interface element (e.g., a button, window, slider, or other user interface element), the particular user interface element is adjusted in accordance with the detected input.

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 200, and/or 300) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 200, or device 300.

FIG. 4 is a flow diagram illustrating a method for presenting indications of user contributions in a shared document using an electronic device in accordance with some embodiments. Method 400 is performed at a device (e.g., 100, 200, 300) with a display. Some operations in method 400 are, optionally, combined, the orders of some operations are, optionally, changed, and some operations are, optionally, omitted.

As described below, method 400 provides an intuitive way for presenting indications of user contributions in a shared document. The method reduces the cognitive burden on a user for managing contributions from various users in a shared digital document, thereby creating a more efficient human-machine interface. For battery-operated computing devices, enabling a user to access a user interface indicating user content contributions faster and more efficiently conserves power and increases the time between battery charges. Additionally, the method provides an enhanced technique for presenting the user contributions by reducing the amount of manipulation that a user must perform on the user interface for the document.

Flowchart 400 begins at 402, where a document editing module, such as a notes module 153 or word processing module 284 presents at least a portion of a document. According to one or more embodiments, the document may be "shared" among multiple users and/or user profiles. For example, the document may be accessible for editing, content contribution, content deletion, and the like by multiple users and/or user profiles. The document as presented may be comprised of contributions from the multiple users and/or user profiles. The document may include, for example, a word processing document, a memo, a note, a to-do list, and the like.

The flowchart continues at 404, where the document editing module receives a user input to request to shift the document in a first direction. For example, a user may interact with a touch-sensitive display system 112 or a touchpad 255 to provide user input. The user input may include, for example, a swiping motion in a particular predetermined direction. For example, a user may swipe from one boundary of a display or a user interface for the document editing module toward an opposite direction. According to some embodiments, the particular direction or movement detected as the request may be user-defined.

At 406, a determination is made regarding whether the user input passes a predetermined boundary. For example, if the user input is a swiping motion that begins at a particular location with respect to a display and/or user interface, the motion may be required to pass a predetermined threshold to satisfy block 406. In some embodiments, the predetermined boundary may be a predefined location on the screen and/or user interface which the user input must pass to satisfy block 406. In some embodiments, the predetermined boundary may be determined based on a percentage of the screen and/or user interface, or the like. For example, if the user interface is reduced to take a portion of the screen of the device, the boundary may be in a different location than if the user interface was displayed across the full screen. In some embodiments, the predetermined boundary may be determined with respect to the size of the screen, the size of the user interface, the display mode of the user interface (e.g., portrait or wide screen), and the like. If a determination is made that the user input does not pass a predetermined boundary, then the flowchart returns to 402, and at least a portion of the document remains presented on the screen.

Returning to block 406, if a determination is made that the user input passes the predetermined boundary, then the flowchart 400 continues to 408. At block 408, indications of content contributions are presented with user associations. In one or more embodiment, the indications may identify the content contributed by a particular user, as well as attributing the content contribution to the particular user. For example, the particular user may be attributed by name, username, phone number, date of content contribution, and the like. In some embodiments, a particular user may not be identifiable, and a generic identifier may be used such as "User" or "Someone Else." For example, in one or more embodiments, the identifiers for the users may be obtained from a contacts list for the device, such as in contacts module 137. In some embodiments, the indications may be presented inline with the associated content contribution. Further, in some embodiments, enabling the presentation of the indications of the content contribution to show contributions of different users in a visually distinct manner. In some embodiments, as shown at 410, the presentation of at least a portion of the document may be modified to include the indications of content contributions. For example, a user identifier may be presented in a particular color, and content attributable to that user may be highlighted in the same color. Further, in some embodiments, the document may be navigable while the indications are presented, for example inline and/or within the document. In some embodiments, as a user navigates the document, the indications presented will change dynamically based on the portion of the document being displayed. For example, as a user scrolls through a document, the indications presented may refer to attributions for content visible on the screen.

In some embodiments, the indications of the content contributions may be presented concurrently with the user input, but may only stay on the display screen if the user input passes a predetermined boundary. For example, the indications of the content contributions may be visible as the user swipes across the screen, and, as an example, may slide onto the screen in a synchronized manner with the swiping action. As such, an "incomplete" user input, or a user input which does not surpass the predetermined boundary at 406, may result in presenting a preview of the content contributions.

The flowchart continues at block 412, where a determination is made regarding whether additional user input is received to shift the document. For example, the request may be to move the document in the same direction as that described above with respect to 404. In some embodiments, the additional user input may be a same or similar input as that described above with respect to 404, or may be a unique user input technique. In some embodiments, the additional user input may be a second swiping motion in the same manner as that described above with respect to block 404. If no additional user input is received at 412, then an additional determination is made at block 416.

At block 416, a determination is made regarding whether presentation of the indications ceases. In some embodiments, presentation of the indications may cease, for example, based on a timeout functionality. For example, after a predetermined amount of time from the indications being presented and/or user interaction with the document being detected, the document editing module may cease to present the indications. In some embodiments, the indications may cease based on user input. For example, a particular motion on a touch screen or touch pad may cause the indications to cease to display. Additionally, or alternatively, a user input component may be provided by the document editing module to toggle between display of the indications and causing the indications to cease to be displayed. If at block 416, the presentations of the indications ceases, then the flowchart continues at 402 and at least a portion of the document is displayed until user input is received to request to shift the document in a first direction, causing the indications to be presented again.

Returning to block 412, if a determination is made that additional user input is received to shift the first document, then the flowchart continues at block 414. At block 414, the document editing module may preset additional data in association with the indications of content contributions. For example, if a user swipes once, initial indication information may be presented. Swiping again may cause additional indication information to be presented. The additional indication information may be related to the user to which the content contribution is attributed, or may be associated with the content contribution. For example, the additional indication information may include a user's full name, contact information, or the like. Additionally, or alternatively, the additional indication information may include a timestamp at which the content was contributed, additional history about the content contribution, or the like. The flowchart continues to 415, where a determination is made regarding whether presentation of the indication ceases, as described above, at which point at least a portion of the document is presented, as described above.

Note that details of the processes described above with respect to method 400 (e.g., FIG. 4) are also applicable in an analogous manner to the methods described below. For example, method 500 optionally includes one or more characteristics of the various methods described above with reference to method 400. For example, the indications of content contributions may be presented in various manners, as described below with respect to method 500. As another example, the contributions may be presented within an update activity panel as described below with respect to method 800 and/or method 1000. For brevity, these details are not repeated below.

In some implementations, a user may tap on a sharing affordance presented in a user interface along with the shared document. Tapping on the sharing affordance provides information about sharing within the document. The user may be provided with the latest updates for the document, an option to view all activity of the document, an option to show editor callouts (e.g., the user who provided each content contribution as described with respect to FIG. 4), or an option to manage the shared note. When a user selects the option to view all activity of the document may overlay a user interface that includes information about each activity in the document, which user performed the activity, and the date on which the activity occurred. When a user selects the option to show editor callouts, the process described with respect to FIG. 4 may occur. The document may shift over providing information about content contributions for the content in the document. The content contribution information may be provided inline or in a way to provide the user with information about the user associated with each content contribution. By selecting the option to manage the shared note, a user may be provided with a user interface that allows the user obtain information about who the document is shared with, show the enclosing shared folder, toggle the option for highlighting changes in the document, or hide alerts about activity in the document.

FIG. 5 is a flow diagram illustrating a method for presenting indications of user contributions in a visually distinct manner using an electronic device in accordance with some embodiments. Method 500 is performed at a device (e.g., 100, 200, 300) with a display. Some operations in method 500 are, optionally, combined, the orders of some operations are, optionally, changed, and some operations are, optionally, omitted.

As described below, method 500 provides an intuitive way for presenting indications of user contributions in a shared document. The method reduces the cognitive burden on a user for managing contributions from various users in a shared digital document, thereby creating a more efficient human-machine interface. For battery-operated computing devices, enabling a user to access a user interface indicating user content contributions faster and more efficiently conserves power and increases the time between battery charges. Additionally, the method provides an enhanced technique for presenting the user contributions by reducing the amount of manipulation that a user must perform on the user interface for the document.

Flowchart 500 begins at 502, where a document editing module, such as a notes module 153 or word processing module 284 presents at least a portion of a document. According to one or more embodiments, the document may be "shared" among multiple users and/or user profiles. For example, the document may be accessible for editing, content contribution, content deletion, and the like by multiple users and/or user profiles. The document as presented may be comprised of contributions from the multiple users and/or user profiles. The document may include, for example, a word processing document, a memo, a note, a to-do list, and the like. In some embodiments, it may be useful to display only unseen content contributions, or display unseen content contributions in a visually distinct manner from previously seen content contributions. This may additionally have the effect of reducing user keystrokes or cognition by not requiring a user to sift through all indications of content contributions to find those not yet reviewed by the user.

The flowchart continues at 504, where the document editing module receives a user input to request to shift the document in a first direction. For example, a user may interact with a touch-sensitive display system 112 or a touchpad 255 to provide user input. The user input may include, for example, a swiping motion in a particular predetermined direction. For example, a user may swipe from one boundary of a display or a user interface for the document editing module toward an opposite direction. According to some embodiments, the particular direction or movement detected as the request may be user-defined.

At block 506, a determination is made regarding whether the content contributions include previously presented content contributions. For example, content contributions may be previously presented if a user has previously caused indications to be presented and those indications included the content contributions. Further, the content contributions may be previously presented if the content contributions have been previously presented to the user and/or if the indications corresponding to the content contributions have been previously presented. In some embodiments, the content contributions may be previously presented if the device and/or a device associated with a same user profile has previously displayed the document or the particular portion of the document with the content contributions. Additionally, or alternatively, the content contributions may be previously presented if the device and/or a device associated with the same user profile has previously displayed the indications of content contribution. As an example, in some embodiments, if the content and/or indications associated with the content was in a portion of the document which has not been previously presented, the content contributions may be considered to be previously presented, or may be determined to not be previously presented.

If at 506 a determination is made that there are previously presented content contributions, then the flowchart continues at 508, and indications for the previously presented content contributions are presented in a first visually distinct manner. The indications may be presented in a manner that is visually distinct from indications for content contributions that have not been previously presented. As shown, there are several optional ways in which the indications for previously presented content contributions may be presented, although the presentation style is not limited to those techniques described. Optionally, at 510, the indications may be presented in a first particular style. For example, a font style of the indication may be unbolded, italicized, or the like. In some embodiments, the indications may be presented in a faded manner, or in a particular color. Similarly, at 512, the content corresponding to previously presented content contribution indications may be presented in a particular style. As an example, the content may be displayed in a font style that is unbolded or italicized. In some embodiments, the indications may be presented in a faded manner, or in a particular color. Further, in some embodiments, as shown at 514, visually distinct presentation style may include not presenting indications related to previously presented content contributions, and/or for which the indications have been previously presented.

Continuing from 508, and returning to 506, if a determination is made that there are no previously presented content contributions, the flowchart continues at block 518. At block 518, the indications for new content contributions are presented in a second visually distinct manner. The indications may be presented in a manner that is visually distinct from indications for content contributions that have been previously presented, as described above with respect to 508, in a situation in which there are previously presented content contributions. As shown, there are several optional ways in which the indications for previously presented content contributions may be presented, although the presentation style is not limited to those techniques described. Optionally, at 520, the indications may be presented in a second particular style. For example, a font style of the indication may be bolded, underlined, italicized, or the like. In some embodiments, the indications may be presented in a particular color, or in a manner consistent with a user-identifiable color coordinated manner. Similarly, at 522, the content corresponding to previously presented content contribution indications may be presented in a particular style. As an example, the content may be displayed in a font style that is bolded, underlined, italicized, or the like. In some embodiments, the indications may be presented in a particular color or user-identifiable set of colors. Further, in some embodiments, as shown at 524, visually distinct presentation style may include presenting a demarcation next to a newly presented indication and/or content contribution. As such, in some embodiments, previously presented indications pay continue to be presented without a demarcation.

Note that details of the processes described above with respect to method 500 (e.g., FIG. 5) are also applicable in an analogous manner to the methods described below. For example, method 400 optionally includes one or more of the characteristics of the various methods described above with reference to method 500. As an example, the contributions may be presented within an update activity panel as described below with respect to method 800 and/or method 1100. For brevity, these details are not repeated below.

FIGS. 6A-6E illustrate exemplary user interfaces for content contribution indications, in accordance with some embodiments. The user interfaces in these figures are used to illustrate the processes described above, including the processes in FIGS. 4-5.

FIG. 6A illustrates an example device 600 having a display 605 on which a user interface of a document editing module 615 is presented. The document editing module may include, for example, a notes module 153, a word processing module 284, or the like. The user interface for the document editing module 615 presents at least a portion of a document. The document may include, for example, a word processing document, a memo, a note, a to-do list, and the like. As such, at document content 620A is presented. As described above, the document content 620A may include content contributions from multiple users or user profiles. For example, the document may be accessible for editing, content contribution, content deletion, and the like by multiple users and/or user profiles. As such, the user interface for the document editing module 615 may include, for example, one or more user input modules 610 from which a user can edit the content 620A of the document.

FIG. 6B depicts the document editing module receiving a user input to request to shift the document in a first direction. In particular, the finger of a user 625A utilizes a touch display to drag the document content 620B to the right. The user input may include, as shown, a swiping motion in a particular predetermined direction. For example, a user may swipe from one boundary (here, the left boundary) of a display or a user interface for the document editing module toward an opposite direction (here, the user 625A swipes to the right). In some embodiments, the document editing module may monitor the user input to determine whether the user input passes a predetermined boundary. For example, the predetermined boundary may be determined based on a percentage of the screen and/or user interface, a distance across the screen and/or user interface, or the like.

Figure 6C:
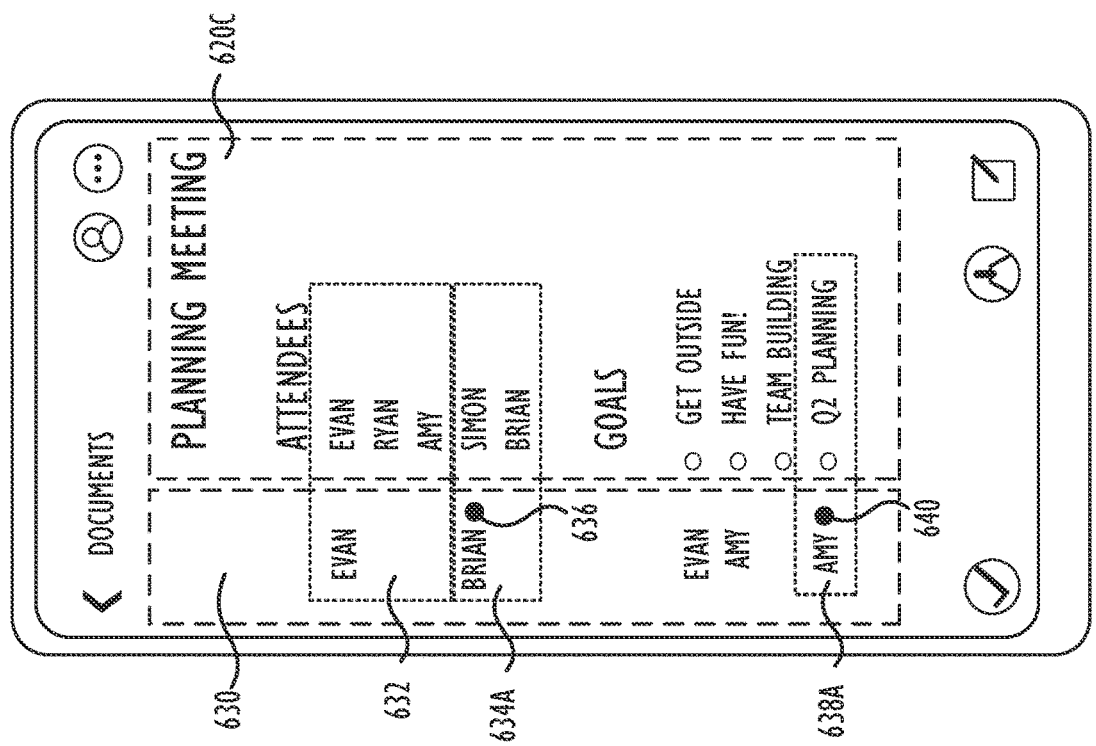

FIG. 6C depicts presenting indications of content contributions with user associations. The indications of content contribution 630 may be presented in a particular portion of the user interface or display. Further, the content 620C has been modified in presentation to be shifted over to make room for the indications of content contribution 630. The indications of content contributions 630 may be presented coincident with a region of the screen or user interface from which the user input was received. In one or more embodiments, the indications may identify the content contributed by a particular user, as well as attributing the content contribution to the particular user. For example, the particular user may be attributed by name, username, phone number, and the like. As shown, in some embodiments, the indications may be presented inline with the associated content contribution. Accordingly, 632 indicates that user Evan provided content that includes the "Evan, Ryan, Amy" in an Attendees list. In other words, the content in the form of a list of names, "Evan, Ryan, Amy," is attributable to user Evan. As shown, the name "Evan" is therefore presented inline next to the start of the content contribution 632. Notably, while dotted lines are shown in the figure noting the boundaries of content attribution 632, the boundaries may not be visible to the user in some embodiments. As another example, 634 indicates that user Brian provided the content that includes "Simon, Brian" in the Attendees list. In addition, 638 indicates that user Amy added the content "Q2 Planning." As described above, in some embodiments, new content contributions, for example indications that have not been previously presented to user 625, or indications that are associated with content contributions that have not been previously presented to the user, are presented in a visually distinct manner from content contributions and/or indications previously presented. As such, 634 and 638 indicate a demarcation (636 and 640, respectively) indicating that the content and/or indication corresponding to the content has not been previously presented.

FIG. 6D depicts the document editing module receiving an additional user input to request to shift the document in the first direction. In particular, the finger of a user 625B utilizes a touch display to drag the document content 620D to the right. The user input may include, as shown, a swiping motion in a particular predetermined direction. For example, a user may swipe from one boundary (here, the left boundary) of a display or a user interface for the document editing module toward an opposite direction (here, the user 625B swipes to the right). In some embodiments, the document editing module may monitor the user input to determine whether the user input passes a predetermined boundary. For example, the predetermined boundary may be determined based on a percentage of the screen and/or user interface, a distance across the screen and/or user interface, or the like.

Figure 6F:
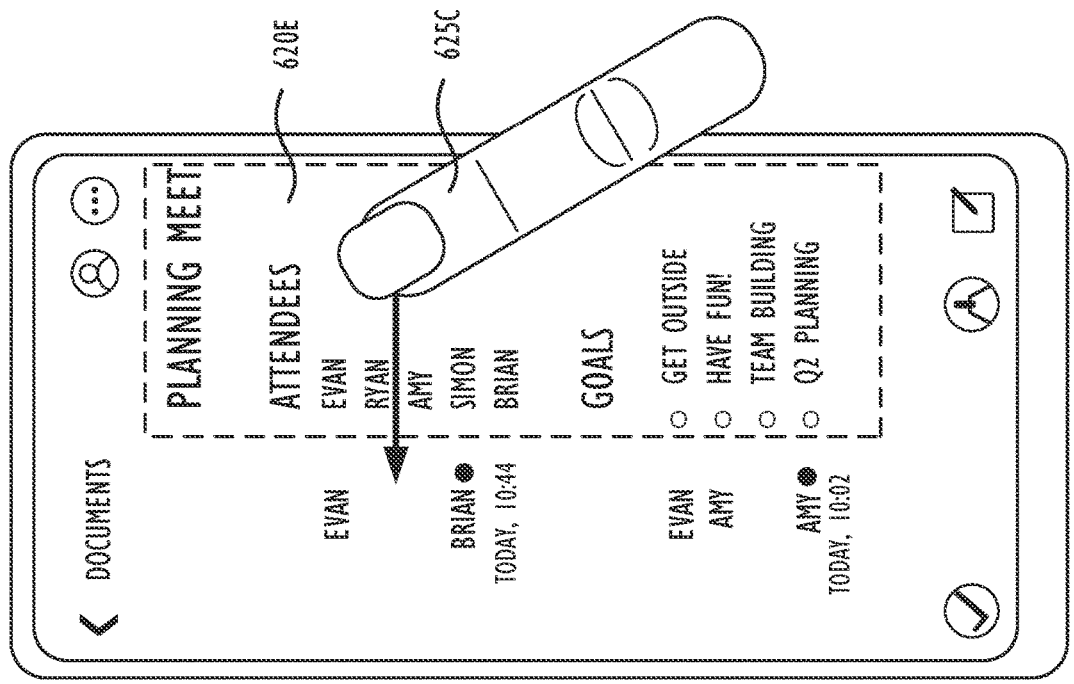
Figure 6E:
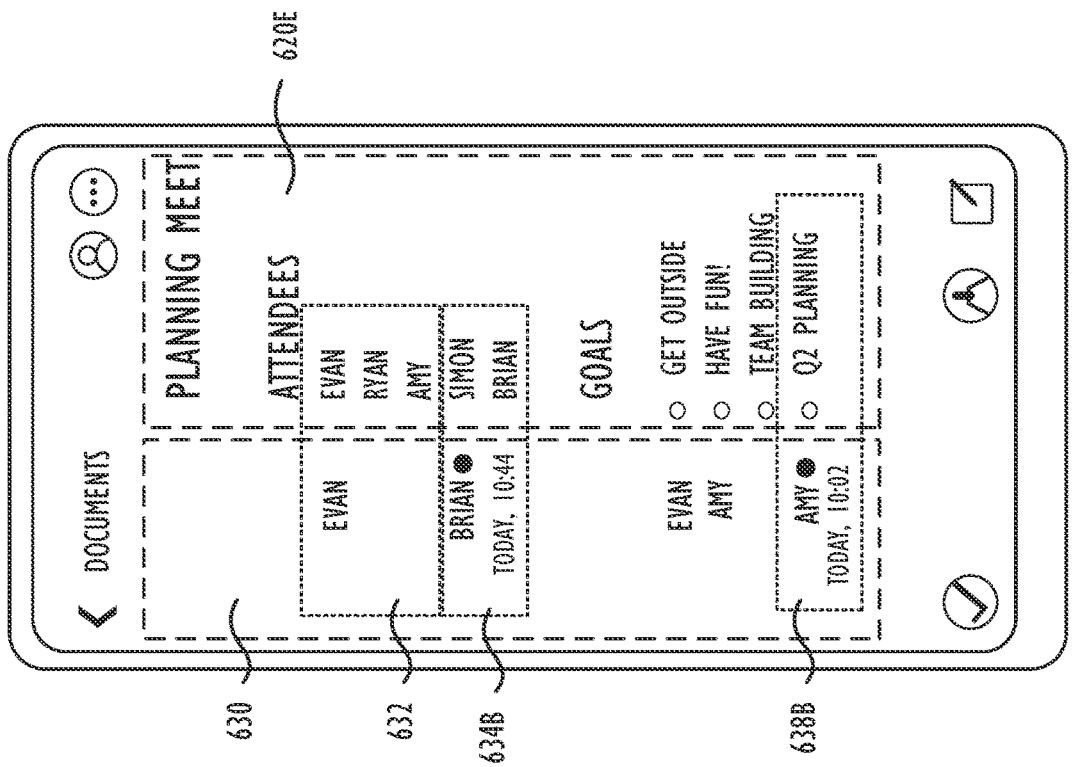

FIG. 6E depicts the document editing module presenting additional data in association with the indications of content contributions. The additional indication information may be related to the user to which the content contribution is attributed, or may be associated with the content contribution. In some embodiments, additional information may be presented for all indications, or only for indications which had not been previously presented. As shown, 632 was not previously indicated as a new indication. As such, 632 does not include any further information. By contrast, 634B and 638B were not previously presented. As such, 634B and 638B include additional information in form of timestamps indicating a time at which the content was contributed. Alternatively, the additional information may be presented for additional indications, such as some or all of those previously presented to the user.

FIG. 6F depicts the document editing module receiving an additional user input to request to shift the document in the second direction. In particular, the finger of a user 625C utilizes a touch display to drag the document content 620E to the left. The user input may include, as shown, a swiping motion in a particular predetermined direction. For example, a user may swipe from one boundary (here, the right boundary) of a display or a user interface for the document editing module toward an opposite direction (here, the user 625C swipes to the left). Alternatively, the user may "grab" the document content 620E and request to slide it back over toward the indications of content contributions. In some embodiments, the document editing module may monitor the user input to determine whether the user input passes a predetermined boundary. For example, the predetermined boundary may be determined based on a percentage of the screen and/or user interface, a distance across the screen and/or user interface, or the like.

Figure 6H:
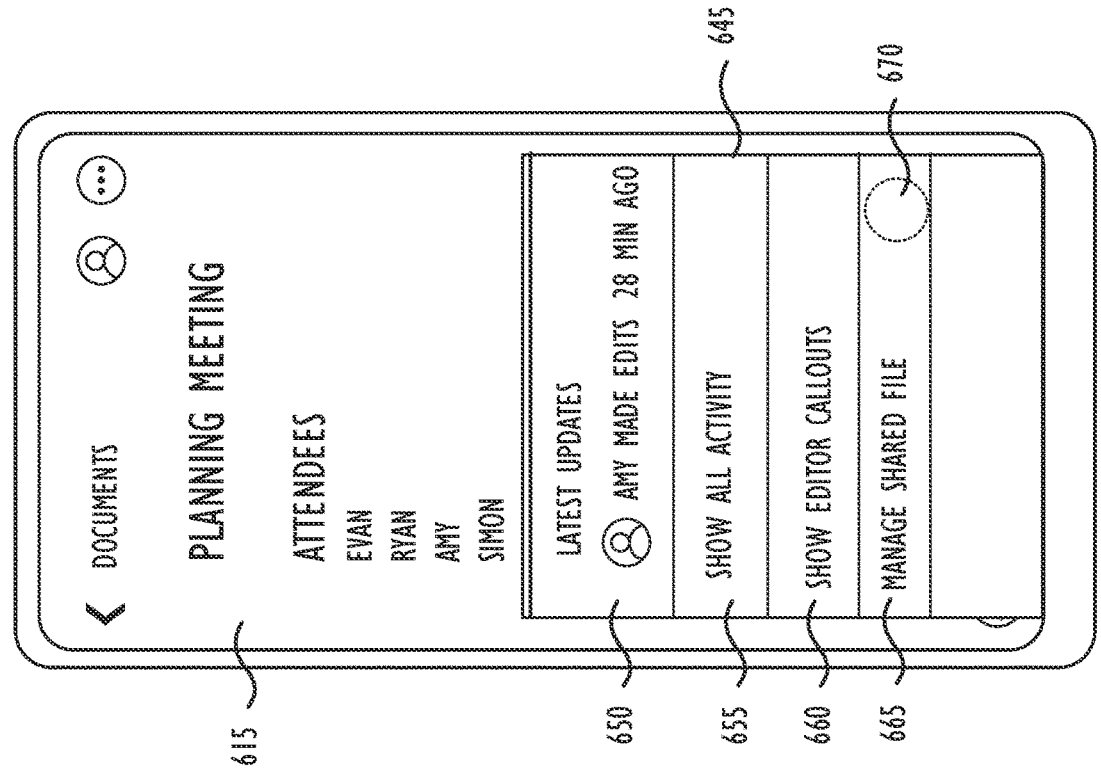
Figure 6G:
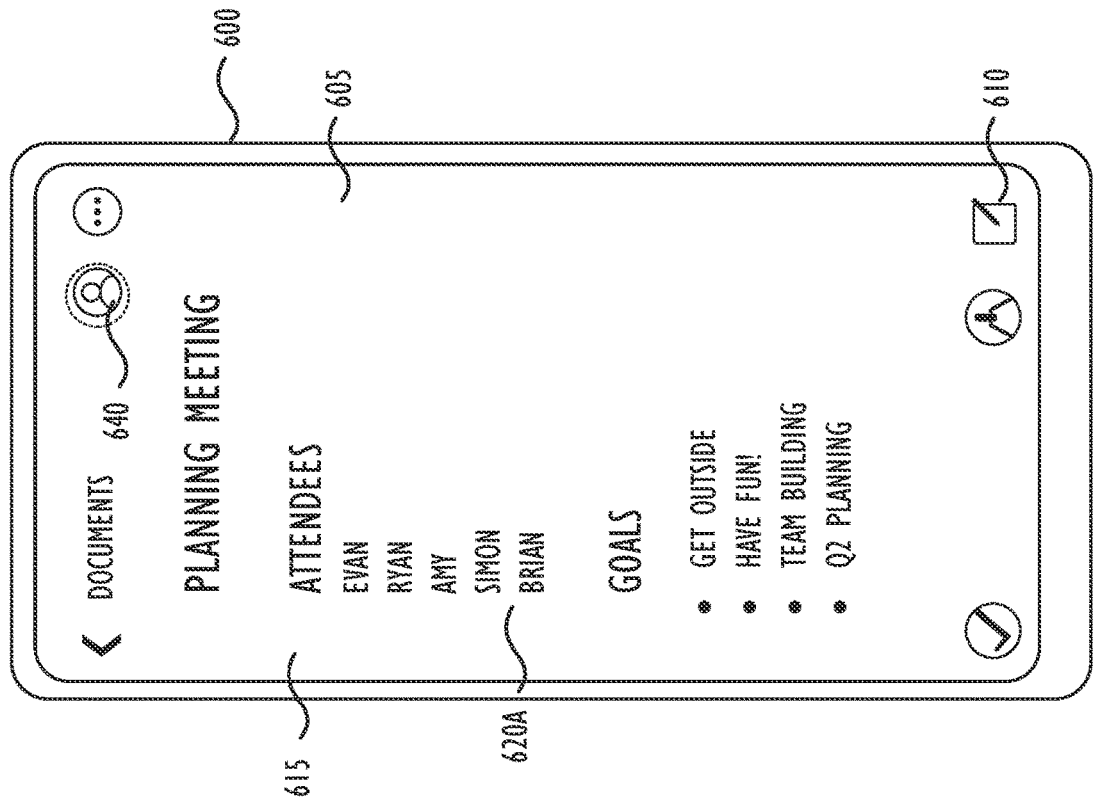

FIG. 6G depicts the document editing module returning to the original presentation of the document in accordance with receiving the user input as shown in FIG. 6F. Specifically, FIG. 6G illustrates the example device 600 having a display 605 on which the user interface of a document editing module 615 is presented. As such, at document content 620A is presented. As described above, the document content 620A may include content contributions from multiple users or user profiles. For example, the document may be accessible for editing, content contribution, content deletion, and the like by multiple users and/or user profiles. As such, the user interface for the document editing module 615 may include, for example, one or more user input modules 610 from which a user can edit the content 620A of the document. In some implementations, a user may tap on or otherwise select a sharing affordance presented in a user interface for the document editing module 615 along with the shared document 620, as depicted by the dotted circle at 640.

FIG. 6H depicts the document editing module having presented a sharing user interface 645 in accordance with the selection of the sharing affordance 640 in FIG. 6G. The sharing user interface 645 may provide information about sharing within the document or file. The user may be provided with the latest updates for the document 650, an option to view all activity of the document 655, an option to show editor callouts 660 (e.g., the user who provided each content contribution as described with respect to FIG. 4), or an option to manage the shared note 665. When a user selects the option to view all activity of the document may overlay a user interface that includes information about each activity in the document, which user performed the activity, and the date on which the activity occurred. When a user selects the option to show editor callouts, the process described with respect to FIG. 4 may occur. The document may shift over providing information about content contributions for the content in the document as shown in FIG. 6E. The content contribution information may be provided inline or in a way to provide the user with information about the user associated with each content contribution. By selecting the option to manage the shared file 665, a user may be provided with an additional user interface, as described below with respect to FIG. 6I. Accordingly, as indicated by dotted circle 670, a user may select the manage shared file option 665.

Figure 6I:
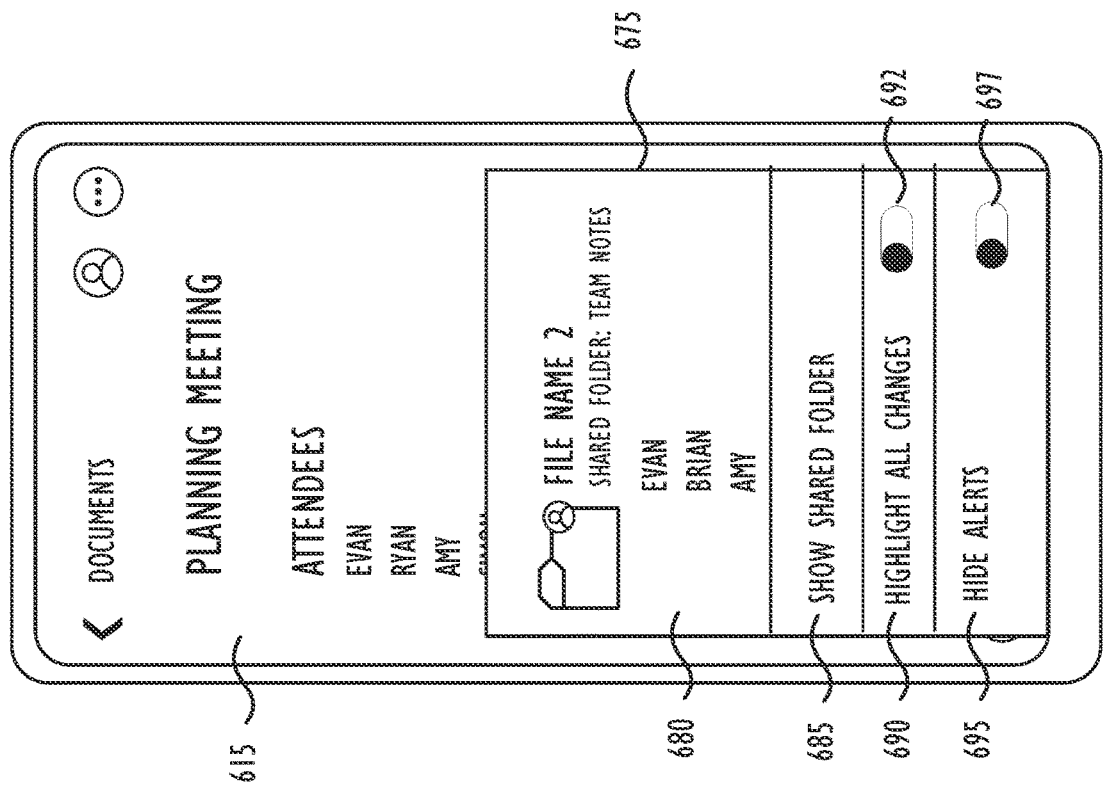

FIG. 6I depicts the document editing module having presented a sharing user interface 645 in accordance with the selection of the manage shared file option 665 in FIG. 6H. According to one or more embodiments, selection of the manage share file option 665 in FIG. 6H causes presentation of a user interface 675 that allows the user obtain information about who the document is shared with 680, show the enclosing shared folder 685, and provide options for highlighting all changes in the file 690, or hiding alerts 695. In one or more embodiments, the option to highlight all changes 690 may be presented with a toggle option 692 for highlighting the changes in the document. In one or more embodiments, activation of the toggle option 692, or otherwise selection of the highlight all changes option 690 may cause the presentation of the content of the document or file 620 in a highlighted form such that the content is highlighted in accordance with a user to which the content is contributed. In some embodiments, user attributions may also be presented inline, as shown in FIG. 6C. The option to hide alerts may be presented with a toggle option 697, from which activation of the hide alerts option 695 may be engaged. However, in some embodiments, the hide alerts option 695 may be selected by other manners. According to some embodiments, hiding alerts prevents presentation of alerts about user activity for the file or document.

FIG. 7 illustrates a flowchart of a technique for presenting an updated activity panel in accordance with some embodiments. Method 700 is performed at a device (e.g., 100, 200, 300) with a display. Some operations in method 700 are, optionally, combined, the orders of some operations are, optionally, changed, and some operations are, optionally, omitted.

As described below, method 700 provides an intuitive way for presenting user activity within a shared folder. The method reduces the cognitive burden on a user for managing contributions from various users among documents in a folder, thereby creating a more efficient human-machine interface. For battery-operated computing devices, enabling a user to access a user interface indicating user content contributions faster and more efficiently conserves power and increases the time between battery charges. Additionally, the method provides an enhanced technique for presenting the user contributions by reducing the amount of manipulation that a user must perform on the user interface for the document.

Flowchart 700 begins at 702, where a file management module displays a user input component associated with a digital file folder. In some embodiments, the file management module may be part of a file manager, or may be part of another module, such as a notes module 153 or word processing module 284. Alternatively, in one or more embodiments, the user input component may be associated with a single digital file or a set of files. In some implementations, a document, e.g., the document described with respect to FIG. 6, may be a file. The user input component may be configured to launch a menu of options for an associated folder and/or to launch an activity panel for the folder. The user input component may be presented in different presentation styles depending upon whether the individual files within the folder have new or unseen activity since a current user last viewed the folder and/or the folder's activity panel. Accordingly, at 704, a determination may be made regarding whether the digital file folder is associated with new activity. According to one or more embodiments, user activity may include, for example, edits to a digital file within the file folder, additions to the folder, deletion of files, and the like. In some embodiments, user activity may include, for example, when users are provided access to the file or folder, or no longer have access to the file or folder. In some embodiments, certain content may be associated with specialized activity, such as if a user is tagged or mentioned within a file in the folder, or if particular tags are used. If at 704 a determination is made that the digital file folder is associated with new activity, then the flowchart continues at 706 and the user input component is presented in a first visual manner. Alternatively, at 704, if a determination is made that the digital file folder is not associated with new activity, then the flowchart continues at 708 and the user input component is presented in a second visual manner. In some embodiments, the first visual manner may be visually distinct from the second visual manner. In some embodiments, the first visual manner may include presenting a demarcation indicating that the file folder is associated with unseen activity. As another example, text associated with the folder may be presented in a particular style, such as bolded or italicized. Further, in some embodiments, the first visual manner at 706 may include presenting a badge for the user input component that indicates the folder is associated with new activity, whereas if the folder is not associated with new activity, the badge will not be presented.

The method 700 continues at 710 where user input is received via the user input component. For example, a user may select the user input component by entering user input while hovering over the user input component. Alternatively, the user may select the user input component by selecting the user input component on a touch screen on which the user input component is displayed. Alternatively, the user may select the user input component through voice or other alternative means.

At 712, an update activity panel is displayed for the digital file folder. In some embodiments, the display of the update activity panel is triggered by the user input. In some embodiments, the user input component may trigger the opening of a menu, from which a user may select to view the update activity panel. In some embodiments, the update activity panel may be presented as a card floating over the user interface, or may be incorporated into a portion of the user interface. In some embodiments, as shown at 714, activity panel may include one or more indications of activity for digital files in the digital file folder from multiple users. That is, a particular indication may include a type of activity or a description of an activity along with some attribution to a user, for example by presenting a name or username, contact information, or other data for the user. In some embodiments, a particular user may not be identifiable, and a generic identifier may be used such as "User" or "Someone Else." For example, in one or more embodiments, the identifiers for the users may be obtained from a contacts list for the device, such as in contacts module 137. If a particular user is not in the contacts list for the device, the user may be identified by the generic identifier label. The digital file folder may be accessible by multiple users, and the activity panel may include a consolidated list of activity attributable to the users provided access to the folder. In some embodiments, the activity panel may show all activity among the files in the folder, or may only show unseen activity and/or unseen indications for activity within the folder.

According to some embodiments, the update activity panel may be organized by user, by history, by associated document, or the like. That is, all activity for a particular may be shown together. As another example, the activity may be presented in a time-based manner, such as in chronological order. As another example, the user activity may be organized by digital file or document such that all activity for a particular file is presented together in the activity panel. Further, any combination of the above, or additional organization techniques may be used. In addition, in some embodiments, a user may toggle between organizational techniques for the user activity. Doing so may quickly allow a user to review activity attributable to other users, especially across multiple files in a shared digital file folder.

The method continues at 716, where a selection of an indication of an activity within the activity panel is received. The selection may be received via user input. For example, a user may select indication of an activity in the folder by entering user input while hovering over the indication. Alternatively, the user may select the indication by selecting the indication on a touch screen on which the indication is displayed. Alternatively, the user may select the indication through voice or other alternative means. The method concludes at 718, where a document or file associated with the selected indication is opened for display. For example, the indication may be selectable to cause an associated file within the file folder to be opened. In some embodiments, the file may be opened within the user interface. Additionally, or alternatively, the file may be opened using a module associated with the file type, and selection of the indication may cause the module associated with the file type to launch in order to present the file.

Note that details of the processes described above with respect to method 700 (e.g., FIG. 7) are also applicable in an analogous manner to the methods described below. For example, method 800 optionally includes one or more of the characteristics of the various methods described above with reference to method 700. For example, the indications of activity may be presented in various manners, as described below with respect to method 800. For brevity, these details are not repeated below.

FIG. 8 illustrates a flowchart of a technique for presenting indications of user activity in accordance with some embodiments. Method 800 is performed at a device (e.g., 100, 200, 300) with a display. Some operations in method 800 are, optionally, combined, the orders of some operations are, optionally, changed, and some operations are, optionally, omitted.

As described below, method 800 provides an intuitive way for presenting user activity within a shared folder in a visually distinct manner. The method reduces the cognitive burden on a user for managing contributions from various users among documents in a folder, thereby creating a more efficient human-machine interface. For battery-operated computing devices, enabling a user to access a user interface indicating user content contributions faster and more efficiently conserves power and increases the time between battery charges. Additionally, the method provides an enhanced technique for presenting the user contributions by reducing the amount of manipulation that a user must perform on the user interface for the document.

Flowchart 800 begins at block 802, where a file management module receives a request to display the update activity panel for the file and/or folder. In some embodiments, the request may be received in various ways, such as those described above with respect to method 700. For example, a user may interact with a touch-sensitive display system 112 or a touchpad 255 to provide user input. The user input may include, for example, selection of an icon or badge, or selection of a menu option for presenting the update activity panel.

At block 804, a determination is made regarding whether the file folder includes previously presented user activity. For example, user activity may be previously presented if a user has previously caused indications of the activity to be presented. Further, the indications of the activity may be previously presented if the associated file has been previously presented to the user after the activity is performed and/or if the indications corresponding to the activity have been previously presented.

If at block 804 a determination is made that there are previously presented content contributions, then the flowchart continues at block 806, and indications for the previously presented activity are presented in a first visually distinct manner. The indications may be presented in a manner that is visually distinct from indications for activity that have not been previously presented. As shown, there are several optional ways in which the indications for previously presented activity may be presented in the user activity panel, although the presentation style is not limited to those techniques described. Optionally, at block 808, the indications may be presented in a first particular style. For example, a font style of the indication may be unbolded, italicized, or the like. In some embodiments, the indications may be presented in a faded manner, or in a particular color. Further, in some embodiments, as shown at block 810, visually distinct presentation style may include not presenting indications related to previously presented activity, and/or for which the indications have been previously presented.

Continuing from block 806, and returning to block 804, if a determination is made that there are no previously presented activities, the flowchart continues at block 814. At block 814, the indications for new activity are presented in a second visually distinct manner. The indications may be presented in a manner that is visually distinct from indications for content contributions that have been previously presented, as described above with respect to 806, in a situation in which there are previously presented content contributions. As shown, there are several optional ways in which the indications for previously presented content contributions may be presented, although the presentation style is not limited to those techniques described. Optionally, at block 816, the indications may be presented in a second particular style. For example, a font style of the indication may be bolded, underlined, italicized, or the like. In some embodiments, the indications may be presented in a particular color, or in a manner consistent with a user-identifiable color coordinated manner. In some embodiments, the particular style may include presenting a demarcation to indication the corresponding activity is new or not previously presented. Further, at block 818, the indications may be presented in a particular color or user-identifiable set of colors. For example, all activity for a particular user may be presented in a particular color.

FIGS. 9A-9D illustrate exemplary user interfaces for presenting an update activity panel, in accordance with some embodiments. The user interfaces in these figures are used to illustrate the processes described above, including the processes in FIGS. 7-8.

FIG. 9A depicts device 900 displaying a user interface of a file management module 905. The user interface of the file management module 905 includes one or more files 910. For purposes of this example, the list of files includes a file called "Team Notes" 915. "Team Notes" is indicated as having new user activity, as shown by demarcation 920. However, it should be understood that in some embodiments, the demarcation may not be present even if new unseen activity is associated with the folder. Additionally, or alternatively, other techniques may be used. By contrast, folder 917, labeled "Ideas" is identified as a shared folder, but is not presented with a demarcation, indication that the "Ideas" folder is not associated with unseen user activity. A user may select the "Team Notes" folder, for example by selecting the folder or a menu associated with the folder. As shown by the dashed circle 925, a user may provide user input for selecting options for the "Team Notes" folder. In some implementations, a user may long press on a particular folder, e.g., "Team Note," to bring up options for the folder including showing folder activity.

FIG. 9B depicts, the user interface for the file management module 905, over which a menu card 930 is presented. According to some embodiments, the menu card 930 is presented in response to receiving the user input depicted by 925 in FIG. 9A. The menu card 930 depicts a set of options for the specific "Team Notes" folder, including managing the shared folder, or viewing folder activity. With respect to viewing folder activity, a demarcation 935 is presented indicating that there is unseen user activity for the "Team Notes" folder. It should be understood that the demarcation 935 may not be presented according to some embodiments. Further, the option to view folder activity may be presented in an alternative visually distinct style to indicate that the particular folder (e.g., "Team Notes") is associated with unseen user activity. As shown by the dashed circle 940, a user may provide user input for selecting the folder activity for the "Team Notes" folder.

In some implementations, e.g., when a user long presses on a particular folder, a view is presented in which a user can view the contents of the folder, e.g., a quick view of the documents in the folder, along with options for the folder. This view may blur the background folder interface and present the summary of the contents along with the folder options clearly in the foreground user interface. When the user selects the summary of the documents in the folder, the user is provided with a list view of all the files in the folder. When the user selects the folder options, the user interface may provide content similar to the content described with respect to FIG. 9B.

Figure 9D:
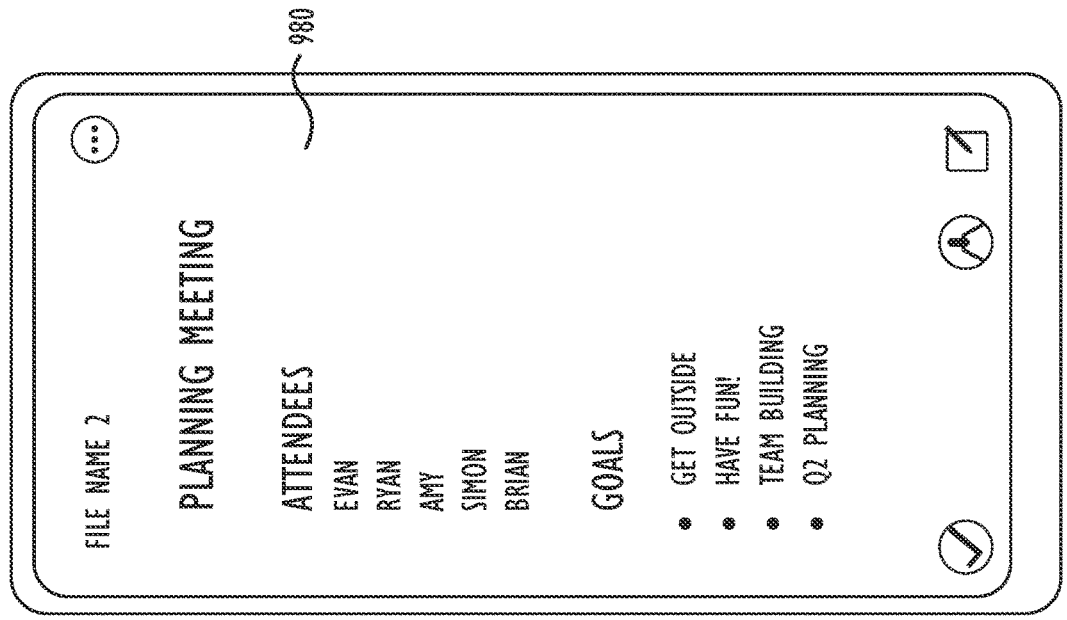
Figure 9C:
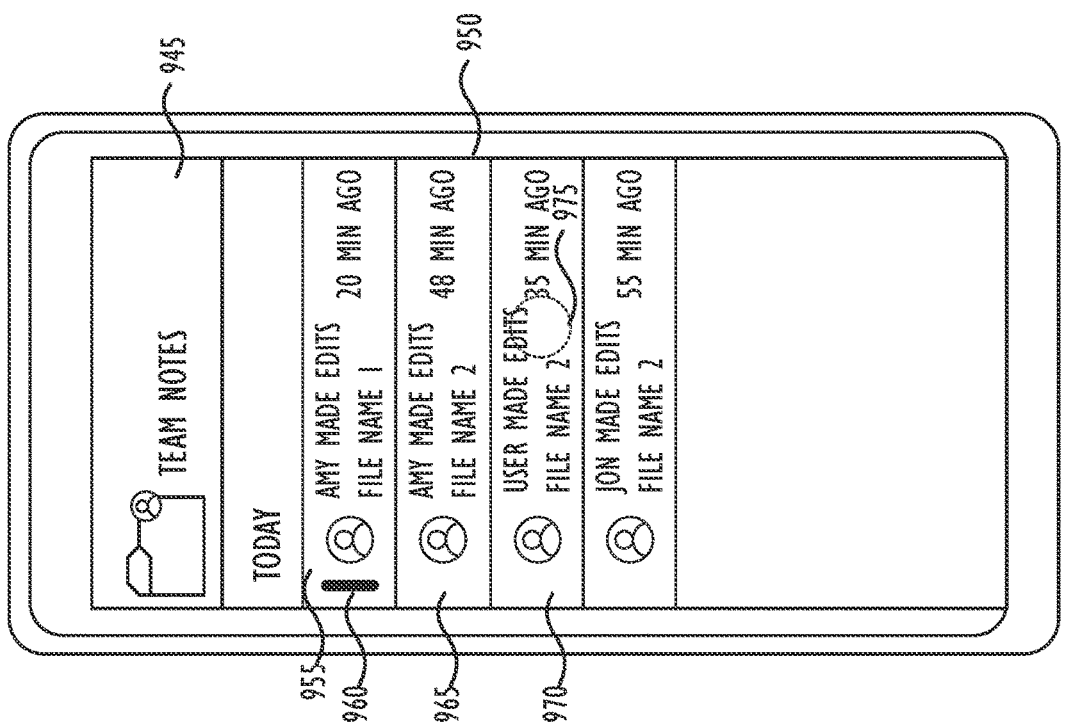

FIG. 9C depicts an example user activity panel 945 for the "Team Notes" folder. According to one or more embodiments, the presentation of the user activity panel 945 is triggered by the user input at 940 of FIG. 9B. As shown, the update activity panel may be presented as a card floating over the user interface, or may be incorporated into a portion of the user interface 905, or may replace the user interface 905. In some embodiments, activity panel 945 may include multiple indications 950 of activity for digital files in the digital file folder from multiple users. As shown, the set of activities may include a first activity 955, in which Amy made edits to File Name 1. In some embodiments, the activity indication may include additional data, such as a timestamp or a duration of time since the activity took place, as shown as "20 Min. Ago." According to one or more embodiments, the activity entry 955 may be presented in a particular style to indicate that the activity is new, or unseen by the user. As such, activity entry 955 is presented with a demarcation 960. By contrast, activity entry 965, also by Amy, and referring to File Name 2, is not presented with a demarcation, indicating that the activity has been previously presented, and/or the document has been presented since the activity took place, according to some embodiments.

In some embodiments, the user from which the activity may be attributed may be determined based on a contacts list for the device, such as in contacts module 137. In some embodiments, a particular user may not be identifiable, and a generic identifier may be used such as "User" or "Someone Else." As shown, activity entry 970 is indicated as being attributable to a user not in the device's contacts list, and thus is presented as "User" rather than by name. As shown by the dashed circle 975, a user may provide user input for selecting a particular activity entry in the update activity panel 945. As shown, a user selects at 975, activity entry 970.

FIG. 9D presents a user interface 980 for presenting File Name 2. Because activity entry 970 is associated with "File Name 2," selection of the entry 970 may trigger presentation of "File Name 2." Further, in some embodiments, selection of the entry may trigger presentation of "File Name 2" at a particular location in the file corresponding to the activity. In some embodiments, the activity panel may be replaced by a user interface for a module from which the file may be opened.

FIGS. 10A-10D illustrate alternate exemplary user interfaces for presenting an update activity panel, in accordance with some embodiments. The user interfaces in these figures are used to illustrate the processes described above, including the processes in FIGS. 7-8.

Figure 10B:
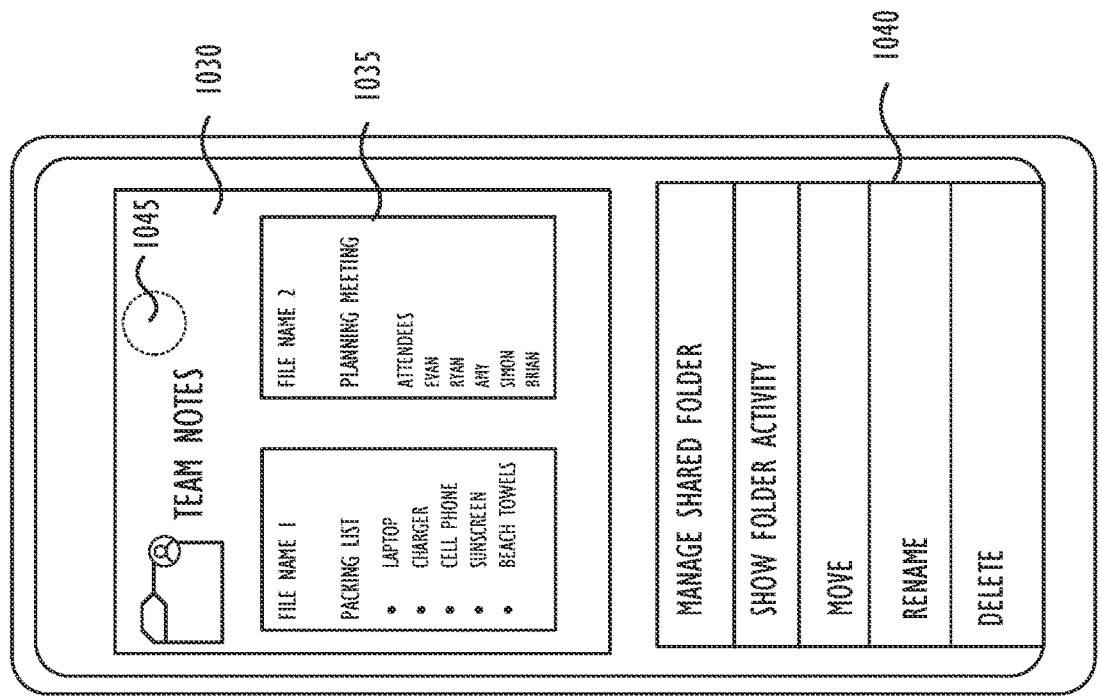
FIGS. 10A-J illustrate additional example user interfaces for presenting user activity, in accordance with some embodiments.
Figure 10A:
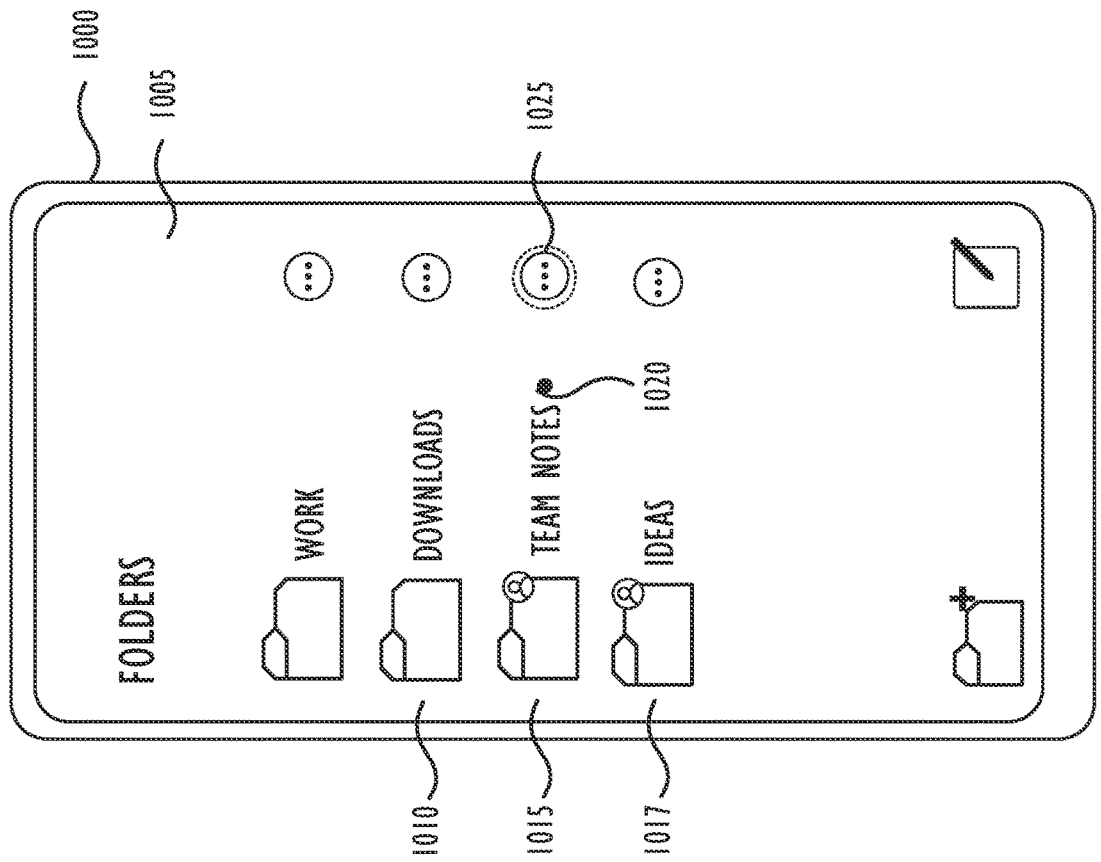

FIG. 10A depicts device 1000 displaying a user interface of a file management module 1005. The user interface of the file management module 1005 includes one or more files 1010. For purposes of this example, the list of files includes a file called "Team Notes" 1015. "Team Notes" is indicated as having new user activity, as shown by demarcation 1920. However, it should be understood that in some embodiments, the demarcation may not be present even if new unseen activity is associated with the folder. Additionally, or alternatively, other techniques may be used. By contrast, folder 1017, labeled "Ideas" is identified as a shared folder, but is not presented with a demarcation, indication that the "Ideas" folder is not associated with unseen user activity. A user may select the "Team Notes" folder, for example by selecting the folder or a menu associated with the folder. As shown by the dashed circle 1025, a user may provide user input for selecting options for the "Team Notes" folder. In some implementations, a user may long press on a particular folder, e.g., "Team Note," to bring up options for the folder including showing folder activity. In some embodiments, the user may select the folder through other means, and in some embodiments, the affordance selected at 1025 may not be present. For example, in some embodiments, a user may select the "Team Notes" folder by utilizing a tap, a press, or a long press on a portion of the screen on which the "Team Notes" folder is represented.

FIG. 10B depicts the user interface for the folder management module 1005, over which a folder preview card 1030 and a menu card 1040 is presented. According to some embodiments, the folder preview card 1030 and the menu card 1040 is presented in response to receiving the user input depicted by 1025 in FIG. 10A. The folder preview card 1030 is a panel on which previews of the files or documents within the folder are presented. For example, "File Name 2" is presented in a preview form at 1035. In some embodiments, the files previewed may be selected, for example, based on alphabetical order by file name, chronological order or backward chronological order based on creation, most recently accessed by a current user or any user, most recently modified or edited by the current user or any user, or the like. The menu card 1040 depicts a set of options for the specific "Team Notes" folder, including managing the shared folder, adding a document, and deleting a document. As shown by the dashed circle 1045, a user may select the folder preview card 1030.

Figure 10D:
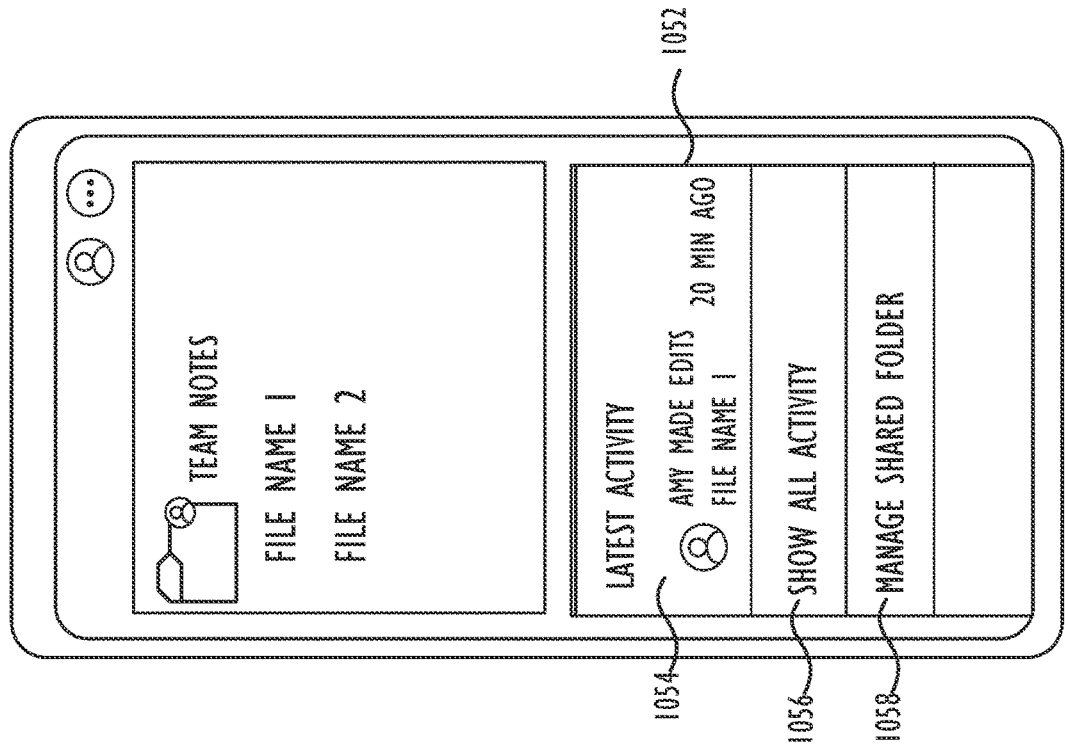
Figure 10C:
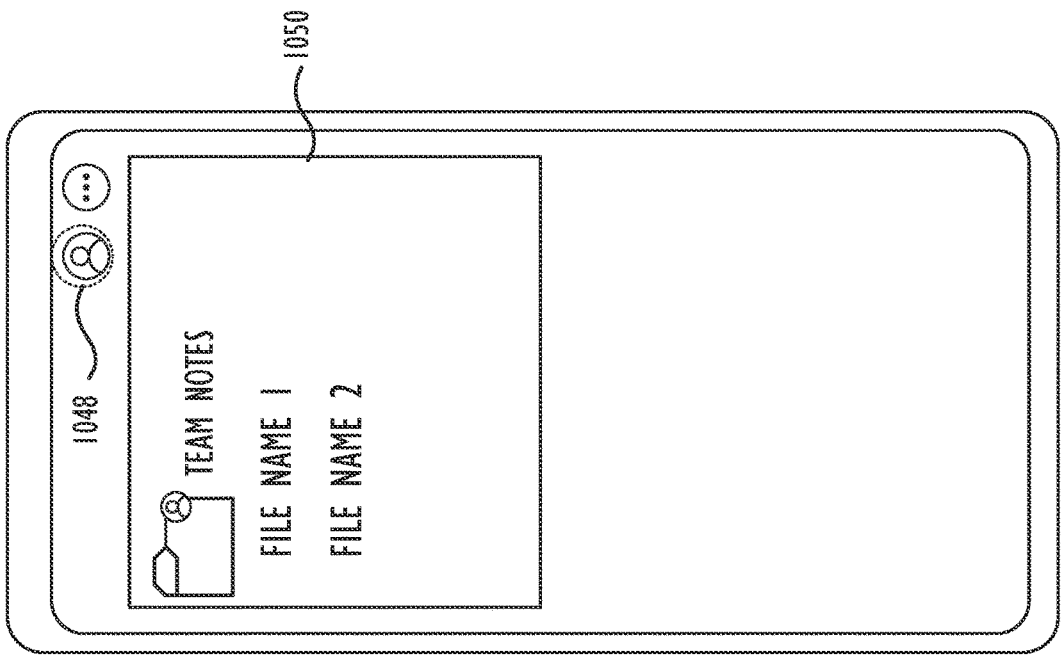

FIG. 10C depicts a folder summary panel 1050, which includes a summary of the contents of the "Team Notes" folder. In addition, as depicted by the dashed circle 1048, an activity affordance may be selected which causes activity information to be presented for the shared folder. Turning to FIG. 10D, selection of the activity affordance at 1048 causes a sharing panel 1052 to be presented. The sharing panel may provide the user with the latest updates 1054 or activity for the shared folder, an option to view all activity of the folder 1056, or otherwise manage the shared folder 1058. In some embodiments, the various components of the sharing panel 1052 may be selectable, for example through an affordance or by a user pressing, tapping, or long pressing the options. For example, selecting an entry of the latest activity 1054 may cause the file or document associated with the entry to be presented. In some embodiments, the file or document may be presented such that the particular activity is visually distinct, such as presenting the portion of the file or document that includes the activity, highlighting the activity, presenting an indication of a content contribution associated with the activity inline on the file or document, or the like. Turning to FIG. 10E, as shown by the dashed circle 1065, the "show all activity" option may be selected at 1060.

Figure 10F:
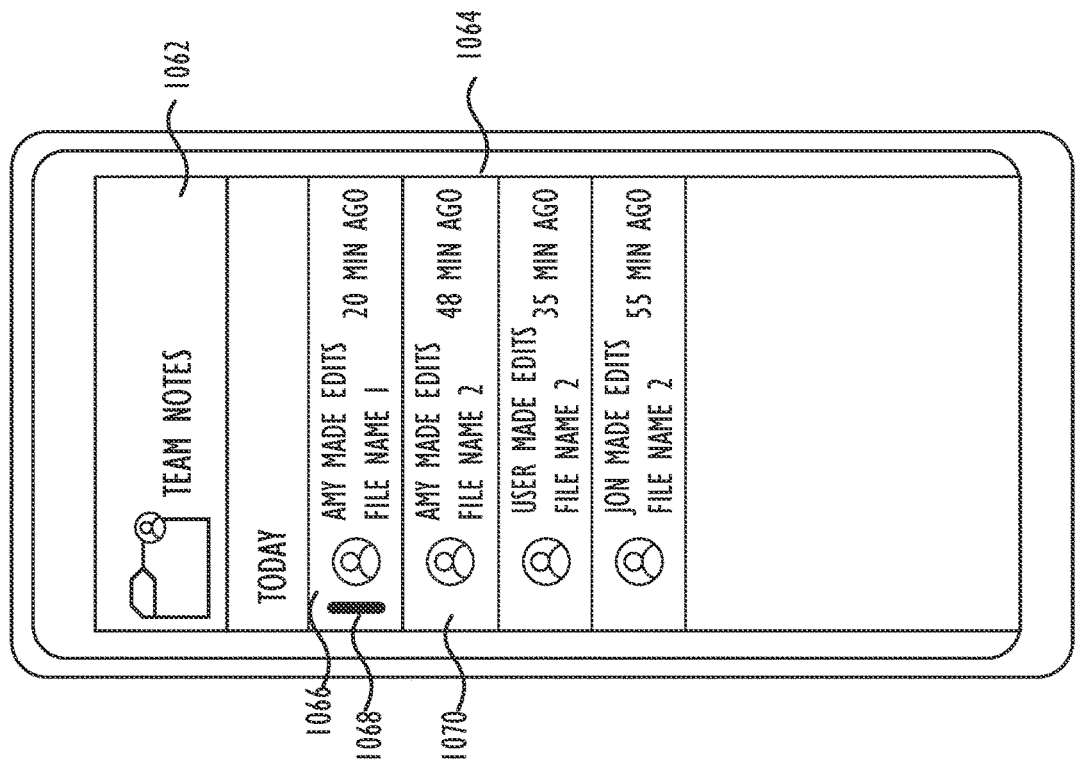
Figure 10E:
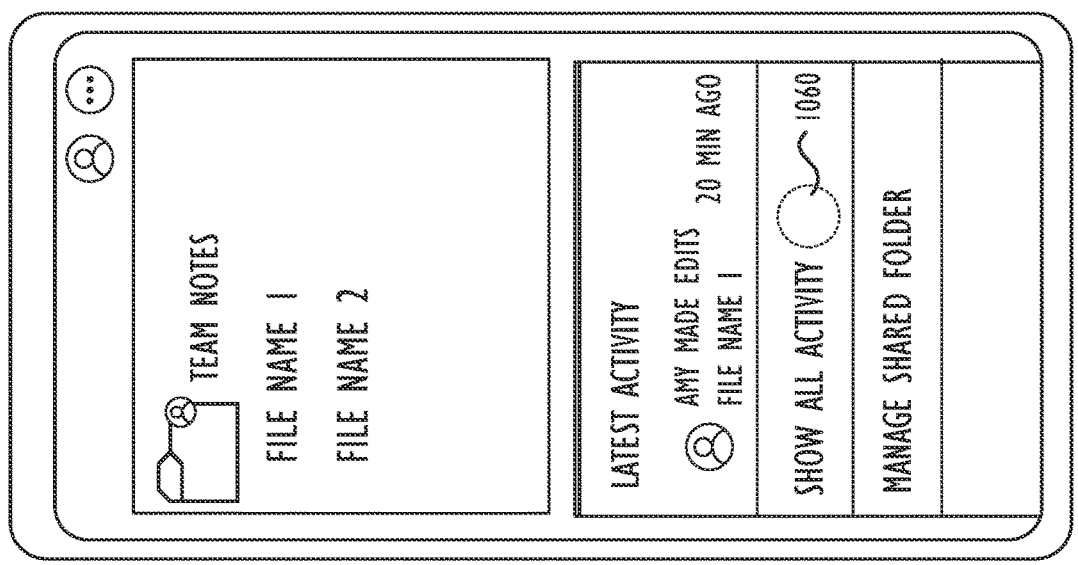

FIG. 10F depicts an example update activity panel 1062 for the "Team Notes" folder. According to one or more embodiments, the presentation of the update activity panel 1062 is triggered by the user input at 1060 of FIG. 10E. As shown, the update activity panel 1062 may be presented as a card floating over the user interface, or may be incorporated into a portion of the user interface, or may replace the user interface. In some embodiments, although not shown, the update activity panel 1062 may be presented over the folder summary card or other content such that the folder summary card or other content appears blurred in the background, whereas the update activity panel 1062 appears clear. As shown, the set of activities 1064 may include a first activity 1066, in which Amy made edits to File Name 1. In some embodiments, the activity indication may include additional data, such as a timestamp or a duration of time since the activity took place, as shown as "20 Min. Ago." According to one or more embodiments, the activity entry 1066 may be presented in a particular style to indicate that the activity is new, or unseen by the user. As such, Activity entry 1066 is presented with a demarcation 1068. By contrast, activity entry 1070, also by Amy, and referring to File Name 2, is not presented with a demarcation, indicating that the activity has been previously presented, and/or the document has been presented since the activity took place, according to some embodiments.

Figure 10H:
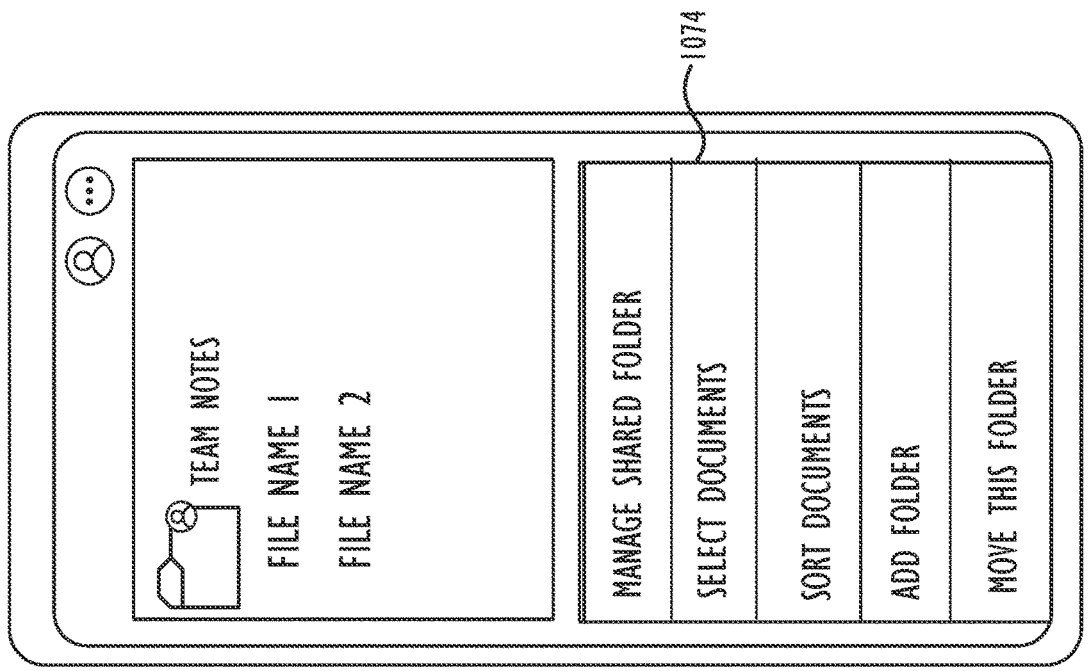
Figure 10G:
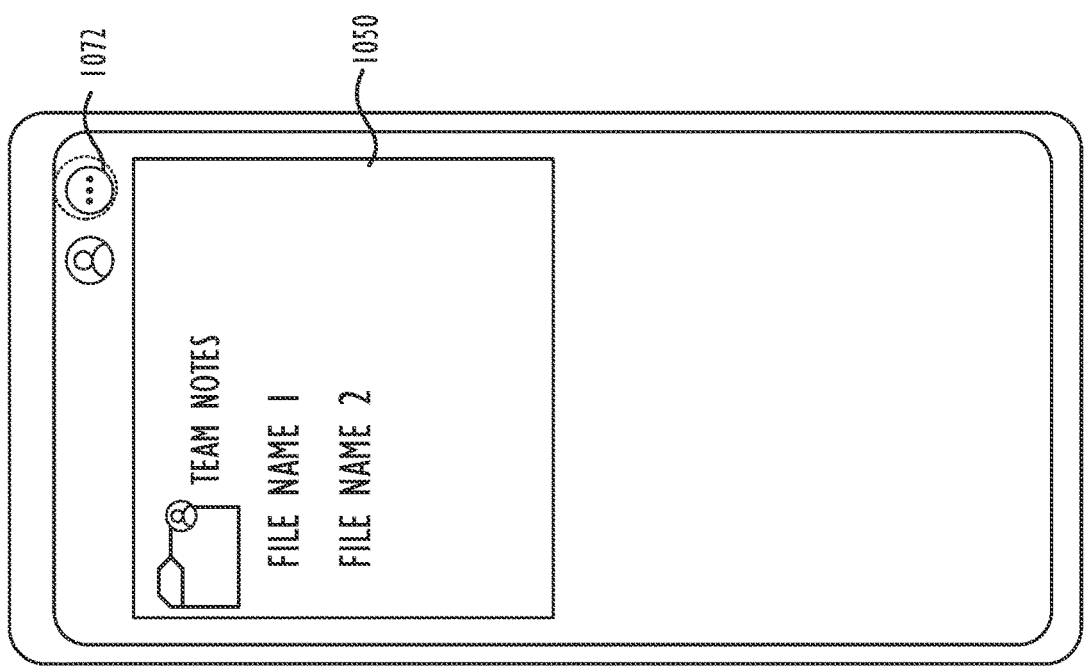

FIG. 10G depicts the folder summary panel 1050, which includes a summary of the contents of the "Team Notes" folder. In addition, as depicted by the dashed circle 1072, a menu affordance may be selected which causes menu items to be presented for the shared folder. Turning to FIG. 10H, selection of the menu affordance at 1072 causes a menu panel 1074 to be presented. The menu panel may provide the user with a set of options for the shared folder, such as managing the shared folder, selecting documents, sorting documents, adding a folder, moving the folder, or the like. In some embodiments, the various components of the menu panel 1074 may be selectable, for example through an affordance or by a user pressing, tapping, or long pressing the options.

Figure 10J:
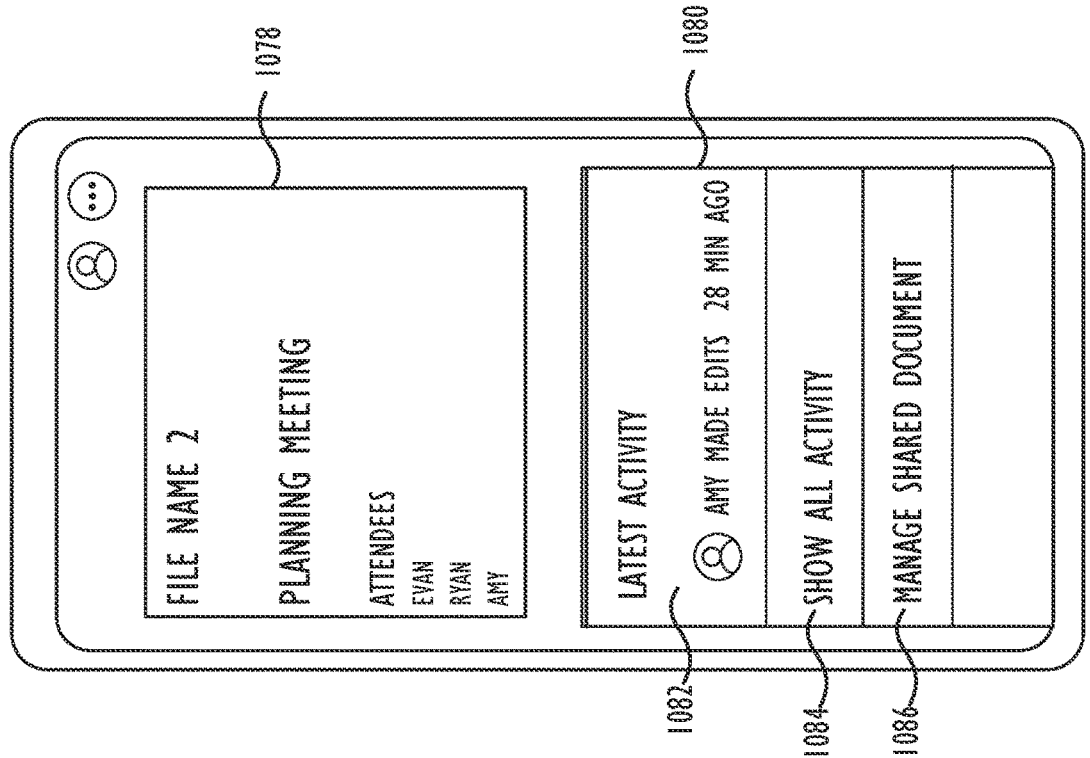
Figure 10I:
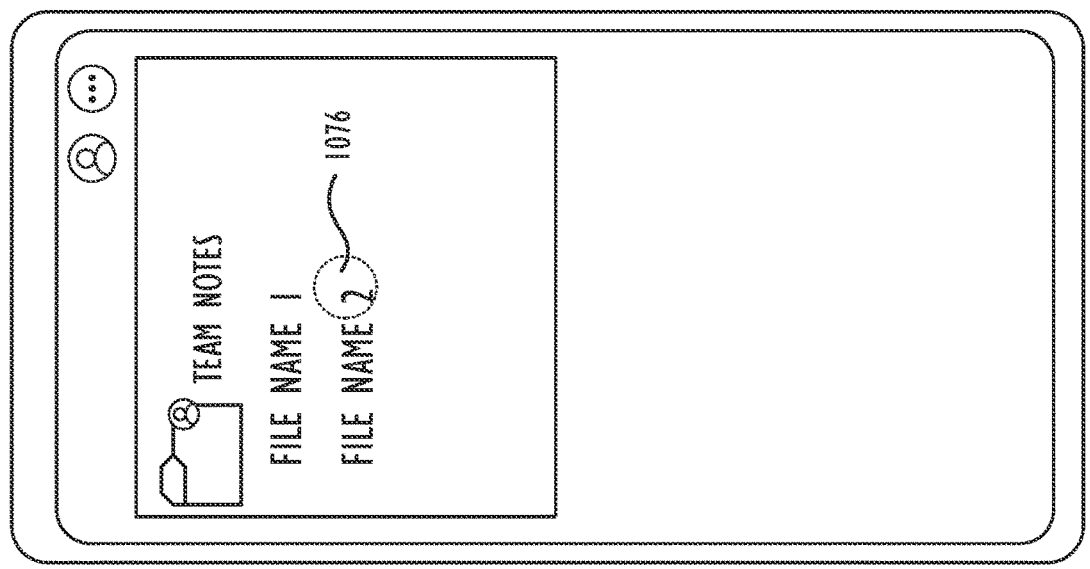

FIG. 10I depicts the folder summary panel 1050, which includes a summary of the contents of the "Team Notes" folder. In addition, as depicted by the dashed circle 1076, a particular file within the shared folder may be selected, such as "File Name 2" as shown here. Turning to FIG. 10J, selection of the "File Name 2" at 1076 causes a document preview panel 1078 to be presented, along with a file-specific sharing panel 1080. The file-specific sharing panel 1080 may provide the user with a set of options for the shared folder. The options may provide the user with the latest updates 1082 or activity for the shared file, an option to view all activity of the file 1084, or otherwise manage the shared file 1086. In some embodiments, the various components of the file-specific sharing panel may be selectable, for example through an affordance or by a user pressing, tapping, or long pressing the options. For example, selecting the option to show all activity 1084 may cause a file-specific update activity panel to be presented.

Figure 11:
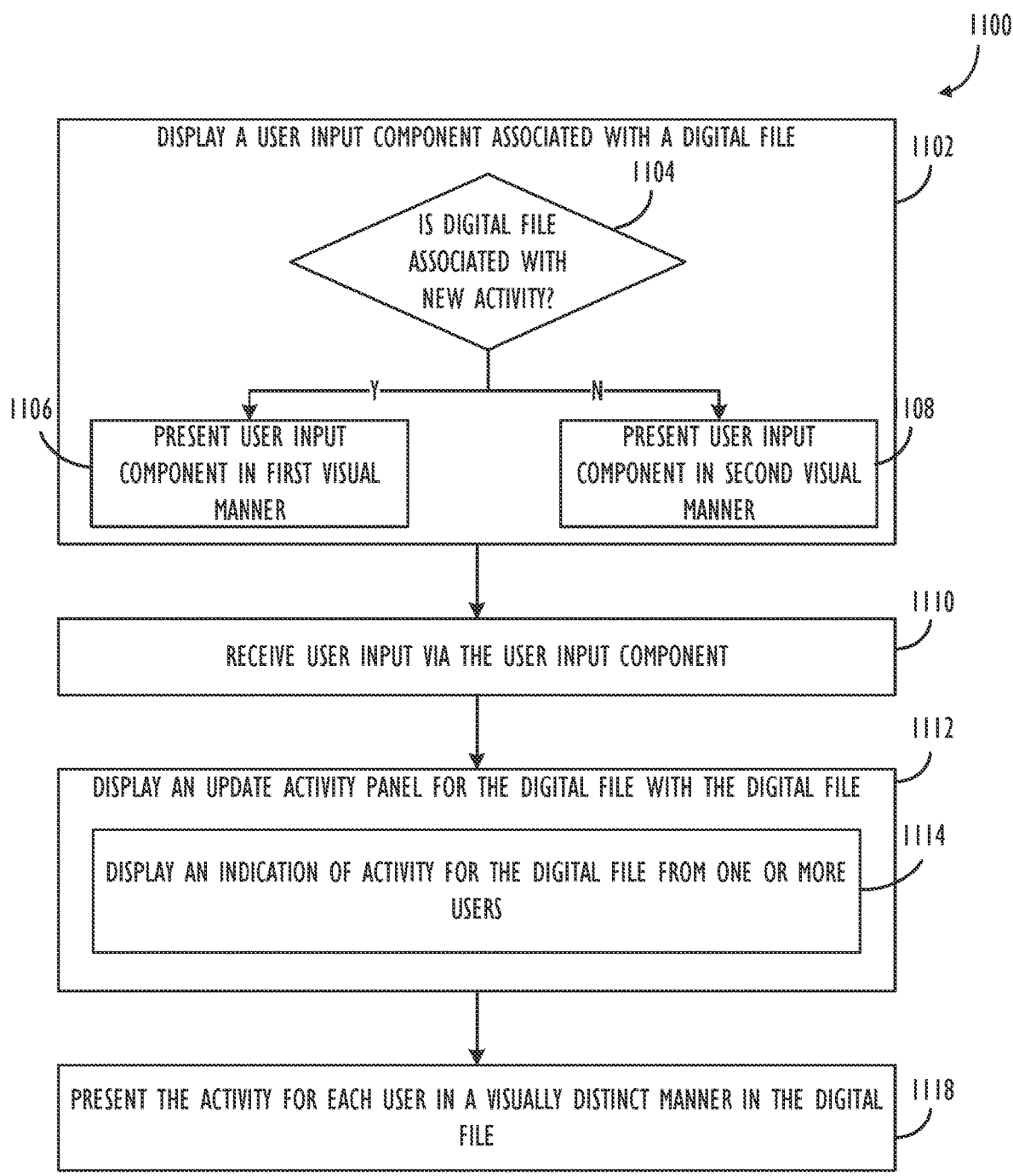
FIG. 11 illustrates a flowchart of a technique for displaying a file-specific update activity panel in accordance with some embodiments.

FIG. 11 is a flow diagram illustrating a method for presenting activity for a shared file using an electronic device in accordance with some embodiments. Method 1100 is performed at a device (e.g., 100, 200, 300) with a display. Some operations in method 1100 are, optionally, combined, the orders of some operations are, optionally, changed, and some operations are, optionally, omitted.

As described below, method 1100 provides an intuitive way for presenting indications of user activity in a shared document or file. The method reduces the cognitive burden on a user for managing contributions from various users in a shared digital document, thereby creating a more efficient human-machine interface. For battery-operated computing devices, enabling a user to access a user interface indicating user content contributions faster and more efficiently conserves power and increases the time between battery charges. Additionally, the method provides an enhanced technique for presenting the user contributions by reducing the amount of manipulation that a user must perform on the user interface for the document.

Flowchart 1100 begins at block 1102, where a file management module displays a user input component associated with a digital file. In some embodiments, the file management module may be part of a file manager, or may be part of another module, such as a notes module 153 or word processing module 284. The user input component may be configured to launch a menu of options for an associated file and/or to launch an activity panel for the file. The user input component may be presented in different presentation styles depending upon whether the file is associated with new or unseen activity since a current user last viewed the file and/or the file's activity panel. Accordingly, at block 1104, a determination may be made regarding whether the digital file is associated with new activity. According to one or more embodiments, user activity may include, for example, edits to a digital file, additions to the file, and the like. In some embodiments, user activity may include, for example, when users are provided access to the file or no longer have access to the file. In some embodiments, certain content may be associated with specialized activity, such as if a user is tagged or mentioned within the file, or if particular tags are used. If at block 1104 a determination is made that the digital file is associated with new activity, then the flowchart continues at block 1106 and the user input component is presented in a first visual manner. Alternatively, at block 1104, if a determination is made that the digital file is not associated with new activity, then the flowchart continues at block 1108 and the user input component is presented in a second visual manner. In some embodiments, the first visual manner may be visually distinct from the second visual manner. Further, in some embodiments, the first visual manner at block 1106 may include presenting a badge for the user input component that indicates the folder is associated with new activity, whereas if the folder is not associated with new activity, the badge will not be presented.

The method 1100 continues at block 1110 where user input is received via the user input component. For example, a user may select the user input component by entering user input while hovering over the user input component. Alternatively, the user may select the user input component by selecting the user input component on a touch screen on which the user input component is displayed. Alternatively, the user may select the user input component through voice or other alternative means.

At block 1112, an update activity panel is displayed for the digital file. In some embodiments, the display of the update activity panel is triggered by the user input. In some embodiments, the user input component may trigger the opening of a menu, from which a user may select to view the update activity panel. In some embodiments, the update activity panel may be presented as a card floating over the user interface, or may be incorporated into a portion of the user interface. In some embodiments, as shown at block 1114, activity panel may include one or more indications of activity for digital files in the digital file folder from multiple users. That is, a particular indication may include a type of activity or a description of an activity along with some attribution to a user, for example by presenting a name or username, contact information, or other data for the user. In some embodiments, a particular user may not be identifiable, and a generic identifier may be used such as "User" or "Someone Else." For example, in one or more embodiments, the identifiers for the users may be obtained from a contacts list for the device, such as in contacts module 137. The digital file may be accessible by multiple users, and the activity panel may include a consolidated list of activity attributable to the users provided access to the file. In some embodiments, the activity panel may show all activity for the file, or may only show unseen activity and/or unseen indications for activity for the file.

According to some embodiments, the update activity panel may be organized by user, by history, or the like. That is, all activity for a particular may be shown together. As another example, the activity may be presented in a time-based manner, such as in chronological order. As another example, the user activity may be organized by digital file or document such that all activity for a particular file is presented together in the activity panel. Further, any combination of the above, or additional organization techniques may be used. In addition, in some embodiments, a user may toggle between organizational techniques for the user activity. The method concludes at block 1118, where the activity for each user is presented in the digital fil in a visually distinct manner. For example, a user identifier may be presented in a particular color, and content attributable to that user may be highlighted in the same color.

Note that details of the processes described above with respect to method 1100 (e.g., FIG. 11) are also applicable in an analogous manner to the methods described below. For example, method 1100 optionally includes one or more of the characteristics of the various methods described above with reference to method 700 or 800. For example, the indications of activity may be presented in various manners, as described below with respect to method 1100.

FIGS. 12A-D illustrate an example user interface for presenting a file-specific update activity panel in accordance with some embodiments. The user interfaces in these figures are used to illustrate the processes described above, including the process in FIG. 11.

Figure 12B:
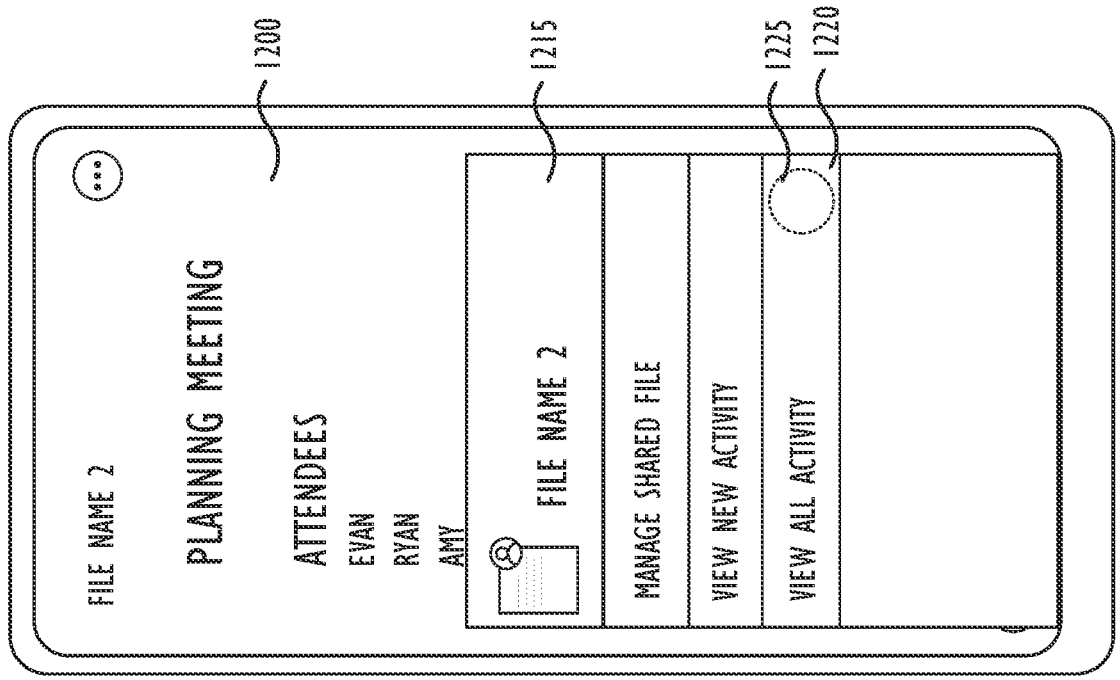
FIGS. 12A-D illustrate an example user interface for presenting a file-specific update activity panel in accordance with some embodiments.
Figure 12A:
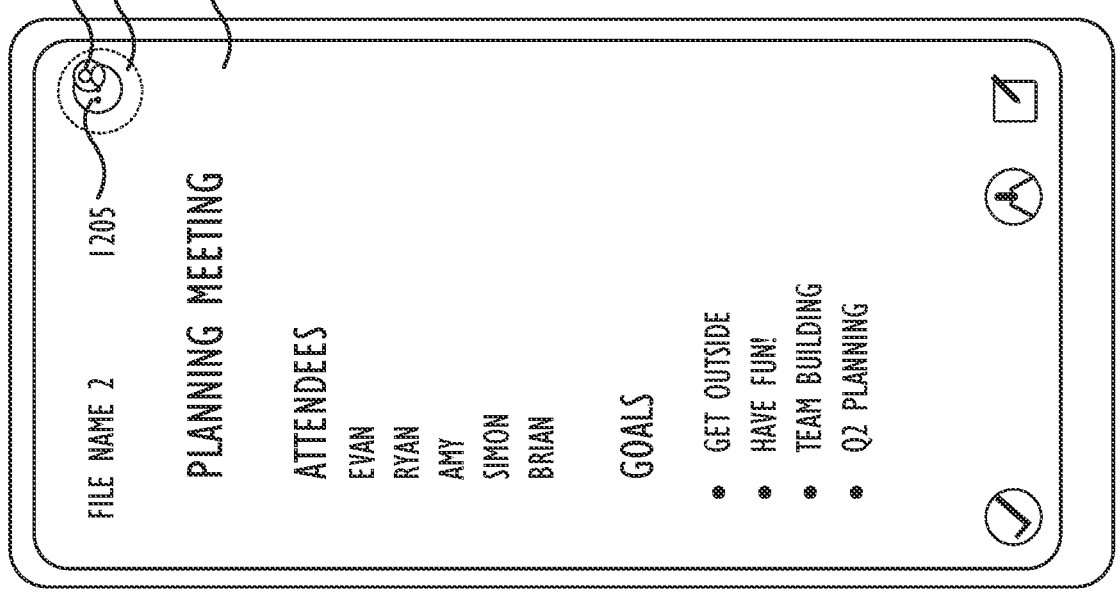

FIG. 12A presents a user interface 1200 for presenting File Name 2. According to some embodiments, the user interface 1200 may correspond to user interface 980 of FIG. 9D. The user interface 1200 depicts content of a particular shared file which may be accessible and editable by multiple users. As depicted, the user interface 1200 may include a user input component 1205. The presentation of the user input component 1205 may be modified to include an activity indicator 1212 indicating that the file is associated with new activity. As shown by the dashed circle 1210, a user may provide user input for selecting the folder activity for the "Team Notes" folder.

FIG. 12B depicts, the user interface for the file management module 1200, over which a menu card 1215 is presented. According to some embodiments, the menu card 1215 is presented in response to receiving the user input depicted by 1210 in FIG. 10A. The menu card 1215 depicts a set of options for the specific "File Name 2" file, including managing the shared file, viewing new activity, or viewing all activity. As shown by the dashed circle 1225, a user may provide user input for selecting to view all activity for the "File Name 2" file, for example, by selecting on a region of the display at which the "View All Activity" option is presented, and/or by selecting an affordance presented in association with the "View All Activity" option.

Figures 12C, 12D:
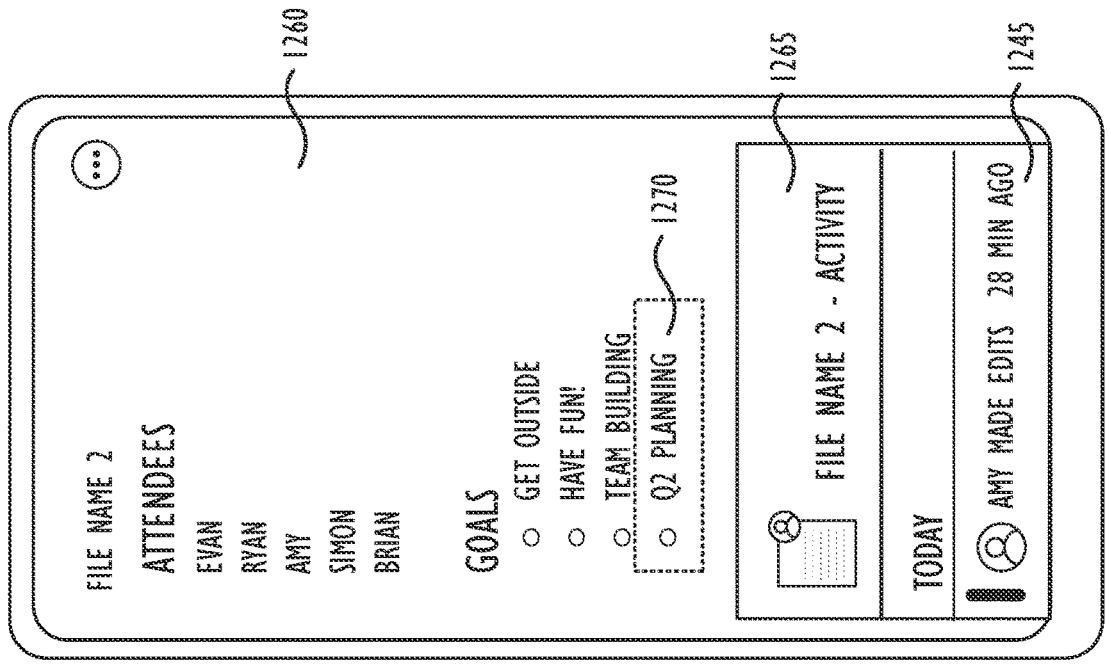

FIG. 12C depicts an example user activity panel 1230 for the "File Name 2" file. According to one or more embodiments, the presentation of the user activity panel 1230 is triggered by the user input at 1225 of FIG. 12B. As shown, the update activity panel 1230 may be presented as a card floating over the user interface, or may be incorporated into a portion of the user interface 1200, or may replace the user interface 1200. In some embodiments, activity panel 1230 may include multiple indications 1235 of activity for the digital file from multiple users. As shown, the set of activities may include a first activity 1245, in which Amy made edits. In some embodiments, the activity indication may include additional data, such as a timestamp or, as shown a duration of time since the activity took place. According to one or more embodiments, the activity entry 1245 may be presented in a particular style to indicate that the activity is new, or unseen by the user. As such, activity entry 1245 is presented with a demarcation 1240. By contrast, activity entry 1260, by an unknown User, is not presented with a demarcation, indicating that the activity has been previously presented in the activity panel 1230, and/or the document has been presented since the activity took place, according to some embodiments. As shown by the dashed circle 1255, a user may provide user input for selecting a particular activity entry in the update activity panel 1230. As shown, a user selects at 1255, activity entry 1245.

FIG. 12D presents a user interface 1260 for presenting File Name 2. Because activity entry 1245 is associated with Amy's edits, File Name 2 is presented in a manner such that Amy's addition 1270 of "Q2 Planning" is visible. Further, according to some embodiments, a consolidated version of user activity panel 1265 is presented in which only edits made by Amy are presented, such as activity entry 1245. Additionally, or alternatively, only activity currently displayable on the user interface 1260 may be presented in the updated user activity panel 1265.

Figure 13B:
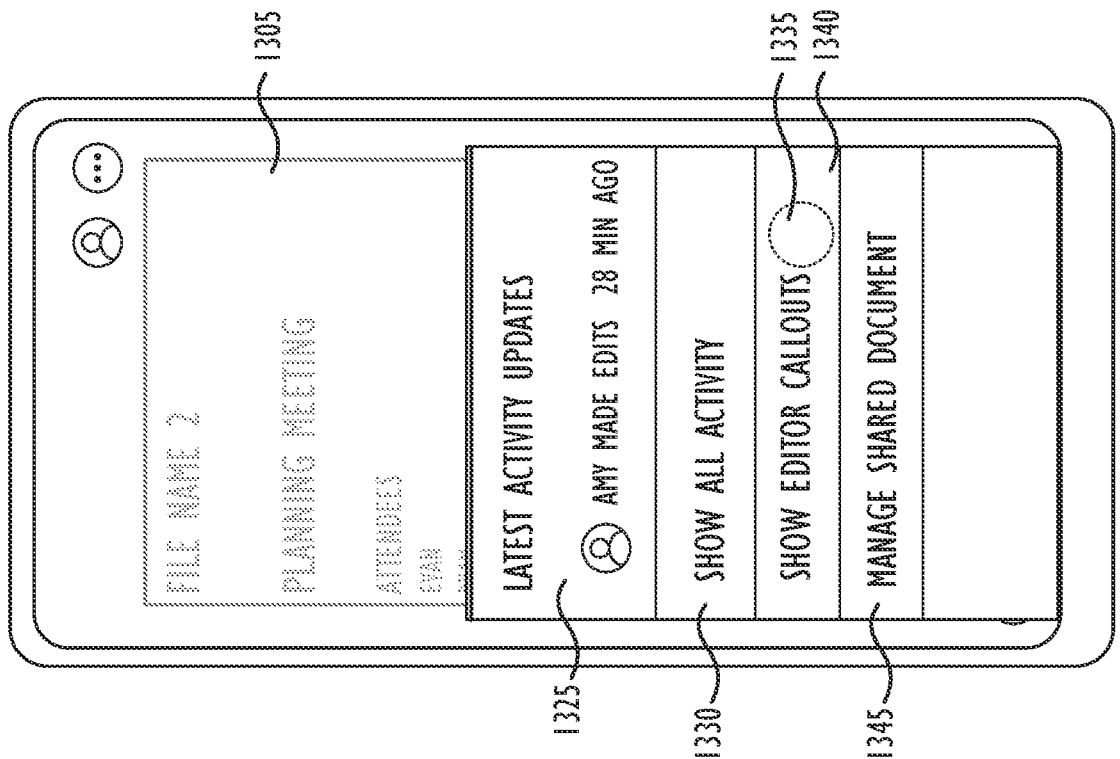
FIGS. 13A-C illustrate an alternate example user interface for presenting a file-specific update activity panel in accordance with some embodiments.
Figure 13A:
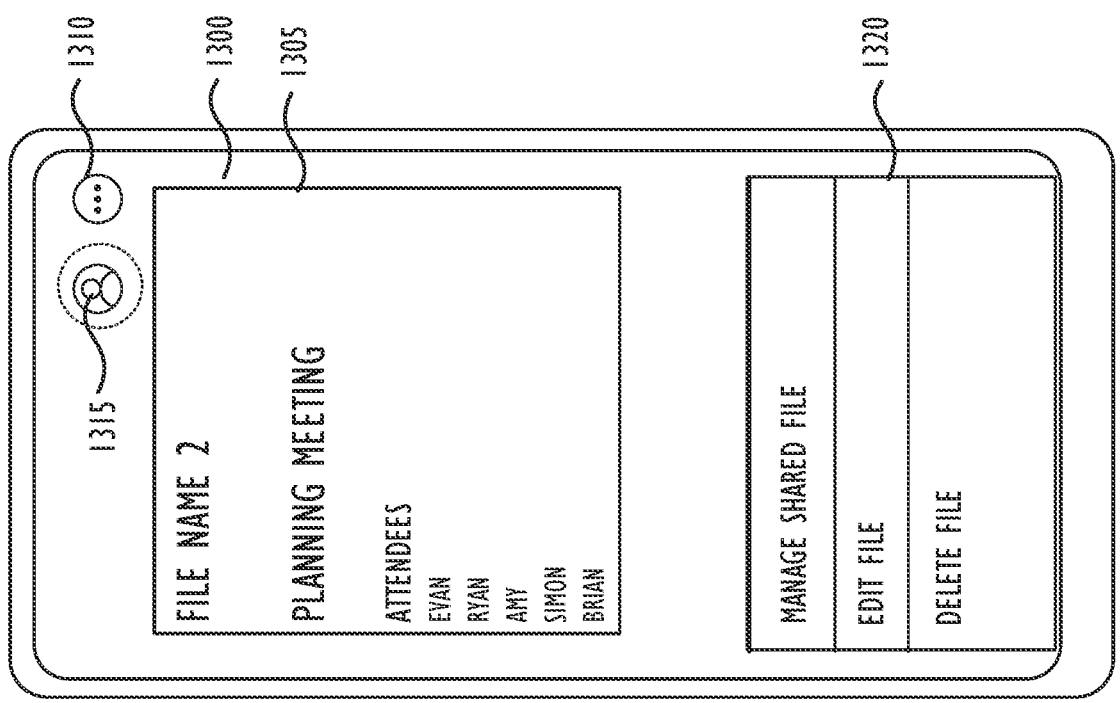
Figure 13C:
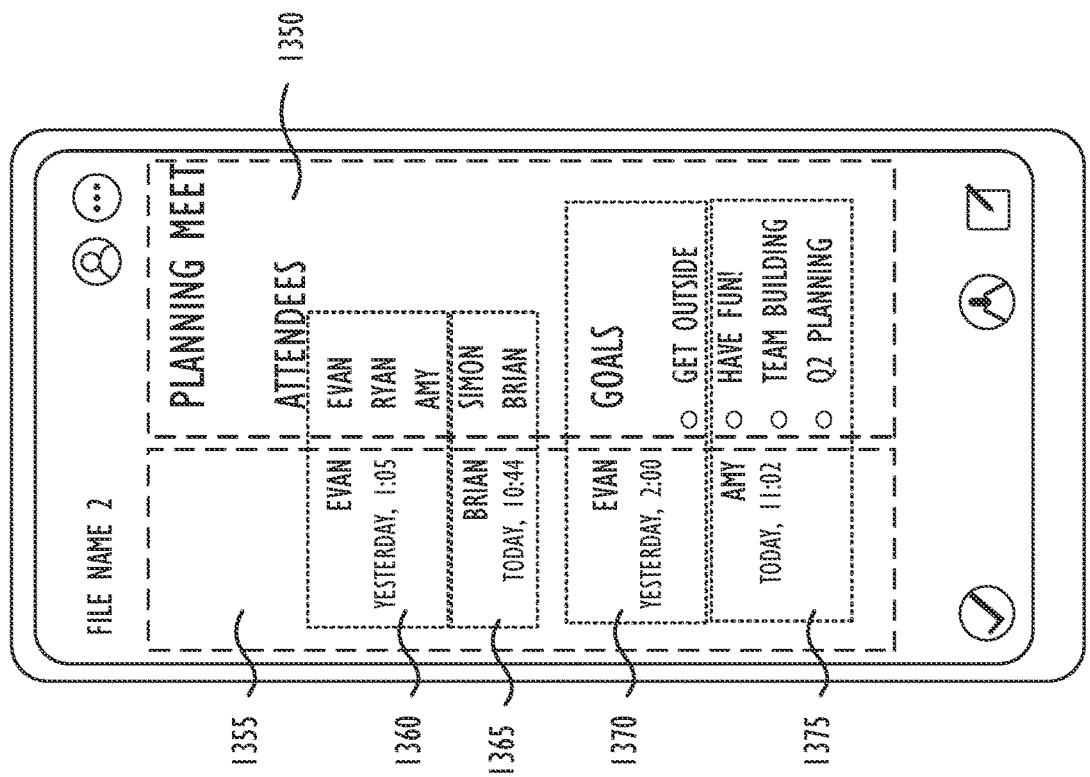

FIGS. 13A-13C illustrate alternate exemplary user interfaces for presenting an update activity panel, in accordance with some embodiments. The user interfaces in these figures are used to illustrate the processes described above, including the processes in FIGS. 4-5 and 7-8.

FIG. 13A depicts an alternate user interface for a file management module 1300. In some embodiments, selection of a file (for example, selection of an activity associated with a particular file in update activity panel 945 of FIG. 9C, or selection of a preview of a file in preview panel 1030 of FIG. 10B) causes a preview card 1305 and a menu card 1320 is presented. The file preview card 1305 is a panel on which previews of the file or documents is presented. For example, "File Name 2" is presented in a preview form at 1305. The menu card 1320 depicts a set of options for the specific "File Name 2" file, including managing the shared file, editing the file, and deleting the file. In addition, in some embodiments, as shown by the dashed circle 1315, a sharing affordance may be selected by a user. Tapping on or otherwise selecting the sharing affordance provides information about sharing activity and other sharing information for the file.

FIG. 13B depicts a sharing menu 1340 for "File Name 2." The sharing menu may include, for example, latest activity updates 1325 for the file or document, as well as selectable options for managing sharing of the application. The selectable options may include, for example, an option to show all activity 1330 for the file or document, an option to show editor callouts 1335 (e.g., the user who provided each content contribution as described with respect to FIG. 4), and/or an option to manage the shared note 1345. When a user selects the option to show all activity 1330 of the document may overlay a user interface that includes information about each activity in the document, which user performed the activity, and the date on which the activity occurred, such as a file- or document-specific version of update activity panel 1070 of FIG. 10D. By selecting the option to manage the shared note 1345, a user may be provided with a file- or document-specific sharing user interface that allows the user obtain information about who the document is shared with, as shown in FIG. 6H. When a user selects the option to show editor callouts 1335, some or all of the process described with respect to FIG. 4 may occur. As shown by the dashed circle 1335, the editor callouts may be requested to be displayed.

FIG. 13C depicts presenting indications of editor callouts in the form of content contributions with user associations. The indications of content contribution 1330 may be presented in a particular portion of the user interface or display. Further, the content 1350 has been modified in presentation to be shifted over to make room for the indications of content contribution 1355. In one or more embodiment, the indications may identify the content contributed by a particular user, as well as attributing the content contribution to the particular user. For example, the particular user may be attributed by name, username, phone number, and the like. As shown, in some embodiments, the indications may be presented inline with the associated content contribution. Accordingly, 1360 indicates that user Evan provided content that includes the "Evan, Ryan, Amy" in an Attendees list. In other words, the content in the form of a list of names, "Evan, Ryan, Amy," is attributable to user Evan. As shown, the name "Evan" is therefore presented inline next to the start of the content contribution 1360. Notably, while dotted lines are shown in the figure noting the boundaries of content attribution 1360, the boundaries may not be visible to the user in some embodiments. As another example, 1365 indicates that user Brian provided the content that includes "Simon, Brian" in the Attendees list. In addition, 1370 indicates that user Evan added the content "Goals" and "Get Outside." Finally, 1375 indicates that user Amy added the content "Q2 Planning." As described above, in some embodiments, new content contributions, for example indications that have not been previously presented to user, or indications that are associated with content contributions that have not been previously presented to the user, are presented in a visually distinct manner from content contributions and/or indications previously presented.

Figure 14A:
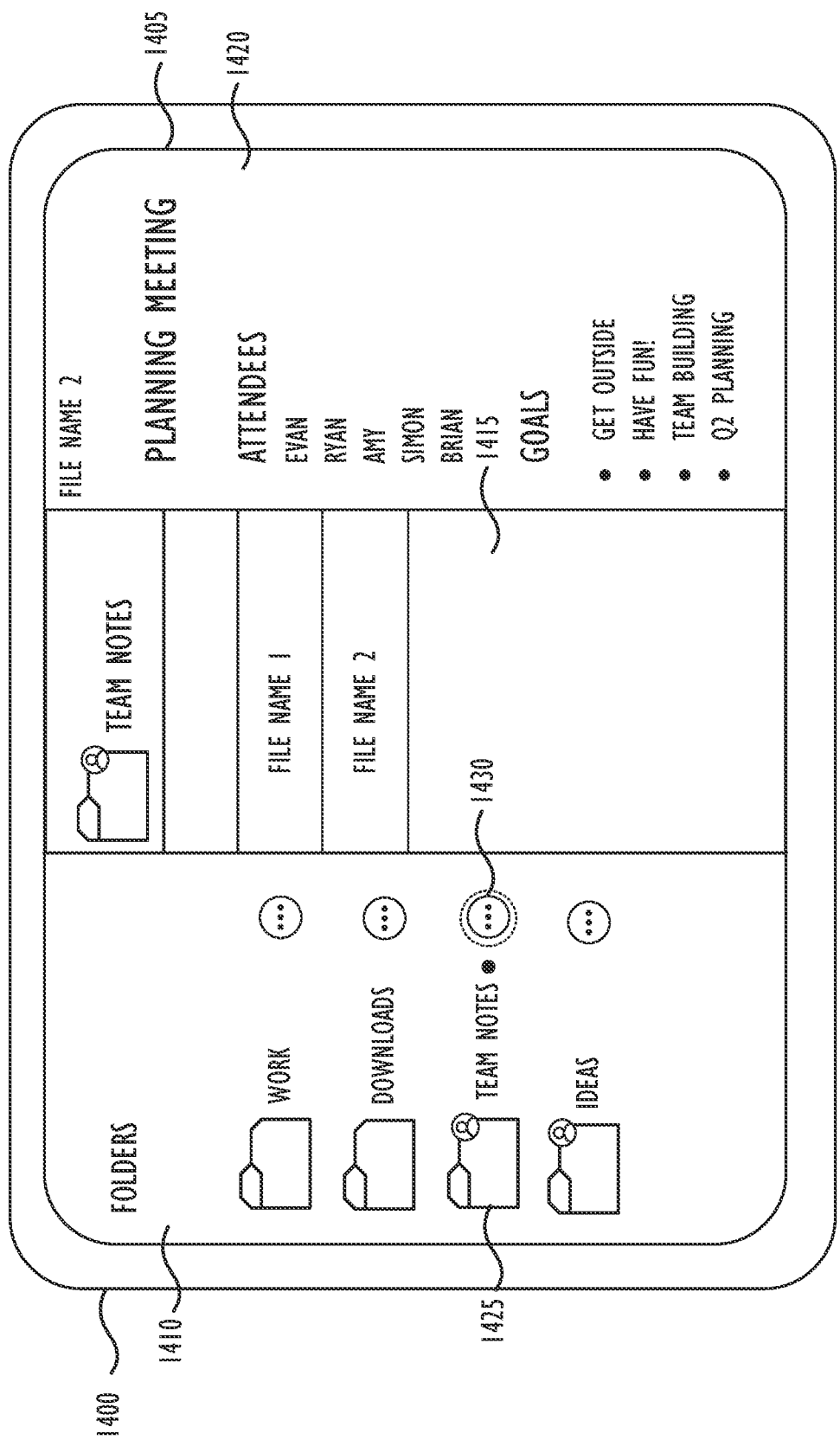
FIGS. 14A-C illustrate an alternate example user interface for presenting an update activity panel in accordance with some embodiments.
Figure 14B:
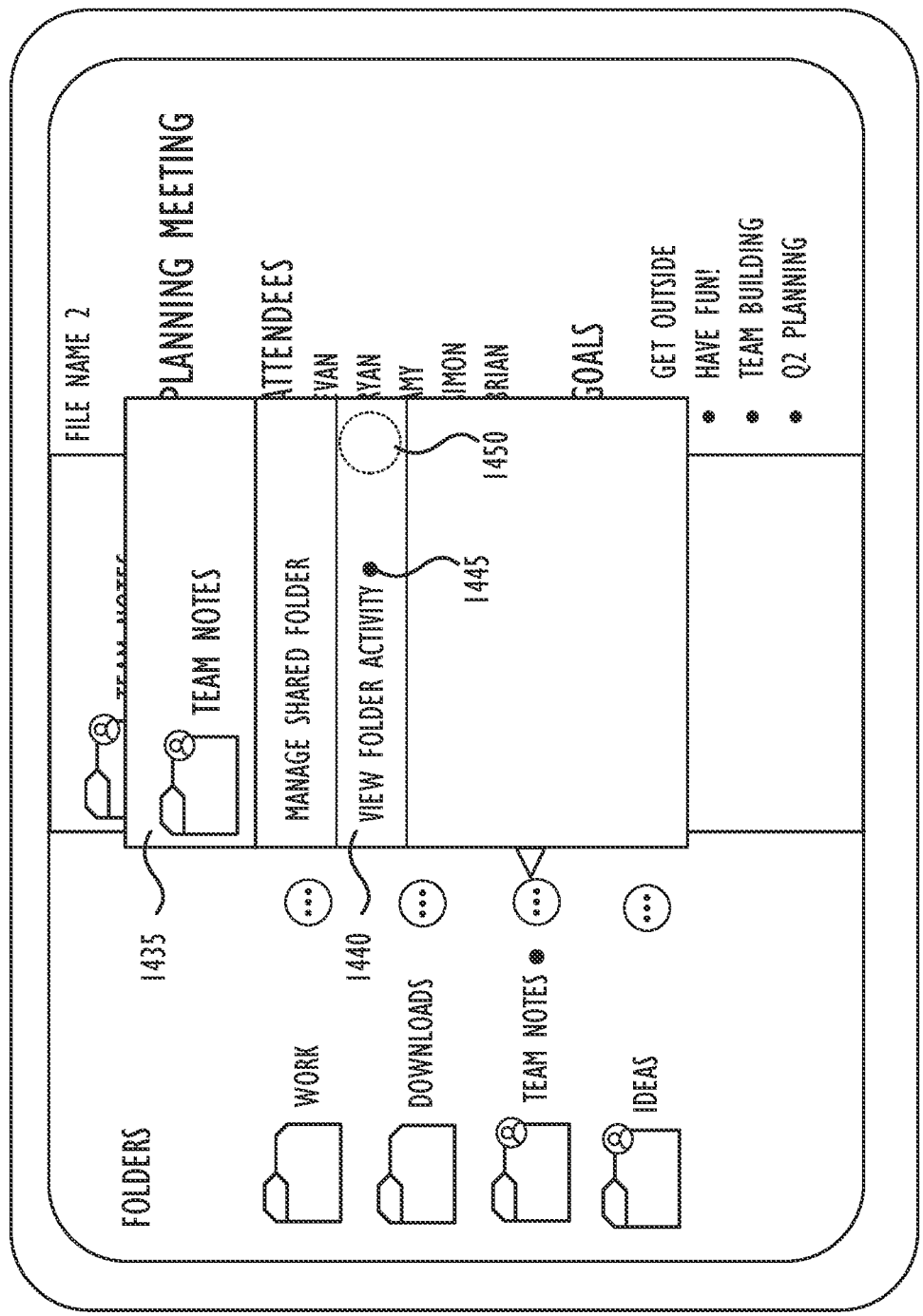
Figure 14C:
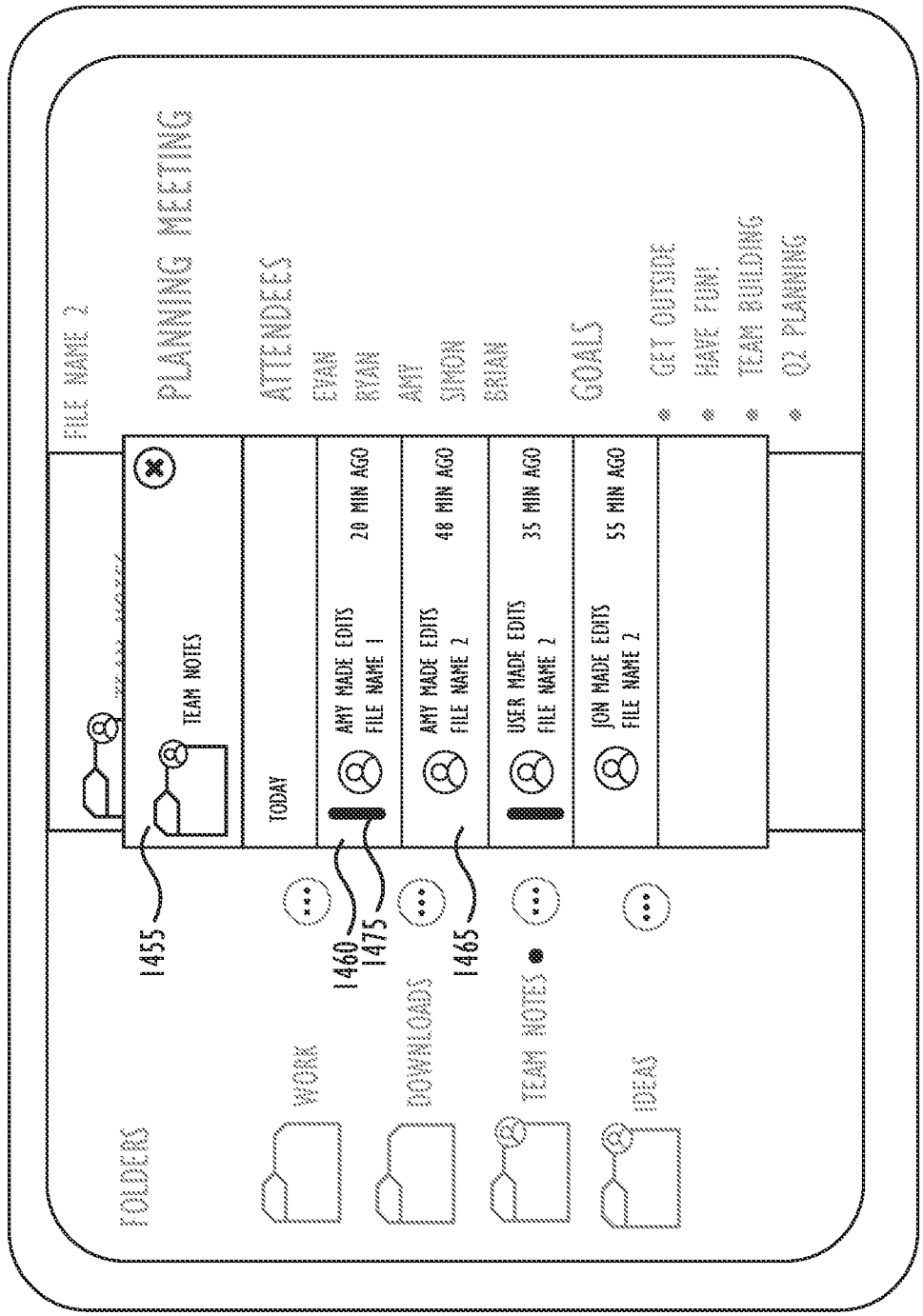

FIGS. 14A-14C illustrate alternate exemplary user interfaces for presenting an update activity panel, in accordance with some embodiments. The user interfaces in these figures are used to illustrate the processes described above, including the processes in FIGS. 7-8.

FIG. 14A depicts device 1400 displaying a user interface of a file management module 1405. The user interface of the file management module 1405 includes a first panel comprising a list of folders. Some folders in the folders panel 1410 may be shared folders for which access is provided to additional users. File management module 1405 also includes a folder preview panel 1415, in which a preview of one of the folders from the folder panel 1410 may be presented, for example, upon selection by a user. File management module 1405 also includes a file preview panel 1420, in which a preview of a particular file may be presented, for example, upon selection by a user from the folder preview panel 1415.

For purposes of this example, the list of files includes a file called "Team Notes" 1425. "Team Notes" is indicated as having new user activity, as shown by a demarcation of a dot that is not present in the list with respect to other folders. However, it should be understood that in some embodiments, the demarcation may not be present even if new unseen activity is associated with the folder. Additionally, or alternatively, other techniques may be used. A user may select the "Team Notes" folder, for example by selecting the folder or a menu associated with the folder. As shown by the dashed circle 1430, a user may provide user input for selecting options for the "Team Notes" folder. In some implementations, a user may tap on an affordance presented in a user interface along with the Team Notes folder. Tapping on the sharing affordance provides information about sharing within the document. In some implementations, an affordance may not be presented and a user may simply select a portion of the display on which the Team Notes folder 1425 is presented.

FIG. 14B depicts, the user interface for the file management module 905, over which a menu card 1435 is presented. According to some embodiments, the menu card 1435 is presented in response to receiving the user input depicted by 1430 in FIG. 14A. The menu card 1435 depicts a set of options for the specific "Team Notes" folder, including managing the shared folder, or viewing folder activity 1440. With respect to viewing folder activity, a demarcation 1445 is presented indicating that there is unseen user activity for the "Team Notes" folder. It should be understood that the demarcation 1445 may not be presented according to some embodiments. As shown by the dashed circle 1450, a user may provide user input for selecting the folder activity for the "Team Notes" folder.

FIG. 14C depicts an example user activity panel 1455 for the "Team Notes" folder. According to one or more embodiments, the presentation of the user activity panel 1455 is triggered by the user input at 1450 of FIG. 14B. As shown, the update activity panel may be presented as a card floating over the user interface, or may be incorporated into a portion of the user interface, or may replace the user interface, or one of the panels within the user interface. In some embodiments, activity panel 1455 may include multiple activity entries for digital files in the "Team Notes" folder from multiple users. As shown, the set of activities may include a first activity 1460, in which Amy made edits to File Name 1. In some embodiments, the activity entry may include additional data, such as a timestamp or a duration of time since the activity took place, as shown as "20 Min. Ago." According to one or more embodiments, the activity entry 1460 may be presented in a particular style to indicate that the activity is new, or unseen by the user. As such, activity entry 1460 is presented with a demarcation 1475. By contrast, activity entry 1465, also by Amy, and referring to File Name 2, is not presented with a demarcation, indicating that the activity has been previously presented, and/or the document has been presented since the activity took place, according to some embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the management of collaborative content. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to indicate attribution for collaborative content in a shared file or folder. Accordingly, use of such personal information data enables users to determine the origins of such content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of collaborative content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, attribution may be presented based on non-personal information data or a bare minimum amount of personal information, such as the content being requested by the device associated with a user, other non-personal information available to the collaborative content, or publicly available information.

What is claimed is:

1. A method, comprising:
presenting at least a portion of a document in a user interface of an editing module, wherein the document is comprised of content contributed from a plurality of users, wherein the document is a shared editable digital document;
receiving a first user input, the first user input including a request to shift the document in a first direction; and
after receiving the request:
in accordance with a determination the request to shift the document in the first direction is to shift the document beyond a predetermined boundary, concurrently presenting a plurality of indications of content contributions, comprising a first content contribution associating a first portion of the content with a first user from which the first portion of the content was contributed, and a second content contribution associating a second portion of the content with a second user from which the second portion of the content was contributed.

2. The method of claim 1, further comprising:
receiving second user input, the second user input including a request to shift the document in the first direction; and
in accordance with the second user input, presenting at least one additional indication of content contribution that was not previously presented,
wherein the at least one additional indication of content contribution represents a content contribution provided to the document after the first user input and before the second user input.

3. The method of claim 2, further comprising:
ceasing to present the plurality of indications of content contributions that were previously presented.

4. The method of claim 2, wherein, in accordance with the second user input, further presenting the plurality of indications of content contributions that were previously presented, wherein the plurality of indications of content contributions are presented in a visually distinct manner from the at least one additional indication.

5. The method of claim 1, wherein the presentation of the document is modified such that the first portion of the content and the are presented in a visually distinct manner in accordance with a corresponding user identifier to which the content contribution is attributable.

6. A non-transitory computer-readable storage medium storing one or more programs configured to be executed by one or more processors of an electronic device with a display and a touch-sensitive surface, the one or more programs including instructions for:
presenting at least a portion of a document in a user interface of an editing module, wherein the document is comprised of content contributed from a plurality of users, wherein the document is a shared editable digital document;

receiving a first user input, the first user input including a request to shift the document in a first direction; and after receiving the request:

in accordance with a determination the request to shift the document in the first direction is to shift the document beyond a predetermined boundary, concurrently presenting a plurality of indications of content contributions, comprising a first content contribution associating a first portion of the content with a first user from which the first portion of the content was contributed, and a second content contribution associating a second portion of the content with a second user from which the second portion of the content was contributed.

7. The non-transitory computer-readable storage medium of claim 6, further comprising instructions for:

receiving second user input, the second user input including a request to shift the document in the first direction; and in accordance with the second user input, presenting at least one additional indication of content contribution that was not previously presented, wherein the at least one additional indication of content contribution represents a content contribution provided to the document after the first user input and before the second user input.

8. The non-transitory computer-readable storage medium of claim 7, further comprising instructions for:

ceasing to present the plurality of indications of content contributions that were previously presented.

9. The non-transitory computer-readable storage medium of claim 6, wherein the presentation of the document is modified such that the first portion of the content and the second portion of the content are presented in a visually distinct manner in accordance with a corresponding user identifier to which the content contribution is attributable.

10. An electronic device, comprising:

a display;

a touch-sensitive surface;

one or more processors; and memory storing one or more programs configured to be executed by the one or more processors, the one or more programs including instructions for:

presenting at least a portion of a document in a user interface of an editing module, wherein the document is comprised of content contributed from a plurality of users, wherein the document is a shared editable digital document;

receiving a first user input, the first user input including a request to shift the document in a first direction; and after receiving the request:

in accordance with a determination the request to shift the document in the first direction is to shift the document beyond a predetermined boundary, concurrently presenting a plurality of indications of content contributions, comprising a first content contribution associating a first portion of the content with a first user from which the first portion of the content was contributed, and a second content contribution associating a second portion of the content with a second user from which the second portion of the content was contributed.

11. The electronic device of claim 10, further comprising instructions for:

receiving second user input, the second user input including a request to shift the document in the first direction; and in accordance with the second user input, presenting at least one additional indication of content contribution that was not previously presented, wherein the at least one additional indication of content contribution represents a content contribution provided to the document after the first user input and before the second user input.

12. The electronic device of claim 11, further comprising instructions for:

ceasing to present the plurality of indications of content contributions that were previously presented.

13. The electronic device of claim 11, further comprising instructions for, in accordance with the second user input, further presenting the plurality of indications of content contributions that were previously presented, wherein the plurality of indications of content contributions are presented in a visually distinct manner from the at least one additional indication.

\* \* \* \* \*